US012472200B2

(12) United States Patent
Millet et al.

(10) Patent No.: US 12,472,200 B2
(45) Date of Patent: Nov. 18, 2025

(54) AUTOBIOTIC COMPOSITIONS AND METHOD FOR PROMOTING HEALTHY GUT MICROBIOME

(71) Applicant: AXCESS GLOBAL SCIENCES, LLC, Salt Lake City, UT (US)

(72) Inventors: Gary Millet, Salt Lake City, UT (US); Matthew Titlow, Carlsbad, CA (US)

(73) Assignees: AXCESS GLOBAL SCIENCES, LLC, Washington, UT (US); Matthew Titlow, Carlsbad, CA (US)

( * ) Notice: Subject to any disclaimer, the term of this patent is extended or adjusted under 35 U.S.C. 154(b) by 0 days.

(21) Appl. No.: 16/874,670

(22) Filed: May 14, 2020

(65) Prior Publication Data

US 2020/0360418 A1 Nov. 19, 2020

Related U.S. Application Data

(60) Provisional application No. 62/848,039, filed on May 15, 2019.

(51) Int. Cl.
| | | |
|---|---|---|
| *A61K 31/715* | (2006.01) | |
| *A61K 9/20* | (2006.01) | |
| *A61K 9/48* | (2006.01) | |
| *A61K 31/22* | (2006.01) | |

(52) U.S. Cl.
CPC ............ *A61K 31/715* (2013.01); *A61K 31/22* (2013.01); *A61K 9/20* (2013.01); *A61K 9/48* (2013.01)

(58) Field of Classification Search
CPC ........ A61K 31/715; A61K 31/22; A61K 9/48; A61K 9/20; A61K 9/0031; A61K 9/02; A61K 9/0095; A61K 47/12; A61K 9/4875; A61K 9/2068; A61P 1/00
See application file for complete search history.

(56) References Cited

U.S. PATENT DOCUMENTS

| | | | |
|---|---|---|---|
| 2,238,149 A | 4/1941 | Aeckerle | |
| 2,976,073 A | 3/1961 | Russell et al. | |
| 4,139,761 A | 2/1979 | Obrowski | |
| 4,224,503 A | 9/1980 | Gijzel et al. | |
| 4,292,499 A | 9/1981 | Kleinschmidt et al. | |
| 4,627,808 A * | 12/1986 | Hughes | A61J 3/077 425/270 |
| 4,663,166 A | 5/1987 | Veech | |
| 4,771,074 A | 9/1988 | Lammerant et al. | |
| 4,969,393 A | 11/1990 | Mahlich et al. | |
| 4,997,976 A | 3/1991 | Brunengraber et al. | |
| 5,093,044 A | 3/1992 | Wretlind | |
| 5,100,677 A | 3/1992 | Veech | |
| 5,116,868 A | 5/1992 | Chen et al. | |
| 5,288,512 A | 2/1994 | Seiden | |
| 5,292,774 A | 3/1994 | Hiraide et al. | |
| 5,654,266 A | 8/1997 | Chen et al. | |
| 5,700,670 A | 12/1997 | Yamagishi et al. | |
| 6,207,856 B1 | 3/2001 | Veech | |
| 6,217,915 B1 * | 4/2001 | Luchansky | A23K 40/30 426/2 |
| 6,232,345 B1 | 5/2001 | Hiraide et al. | |
| 6,316,038 B1 | 11/2001 | Veech | |
| 6,323,237 B1 | 11/2001 | Veech | |
| 6,380,244 B2 | 4/2002 | Martin et al. | |
| 6,613,356 B1 | 9/2003 | Mahakos | |
| 6,706,756 B1 | 3/2004 | Fitzpatrick et al. | |
| 6,835,750 B1 | 12/2004 | Henderson | |
| 7,351,736 B2 | 4/2008 | Veech | |
| 7,807,718 B2 | 10/2010 | Hashim et al. | |
| 7,891,287 B2 | 2/2011 | Miller | |
| 8,101,653 B2 | 1/2012 | Veech | |
| 8,124,589 B2 | 2/2012 | Henderson | |

(Continued)

FOREIGN PATENT DOCUMENTS

| | | |
|---|---|---|
| CA | 2990927 A1 | 7/2018 |
| CN | 86108978 A | 11/1987 |

(Continued)

OTHER PUBLICATIONS

Cresci, G. et al., Lactobacillus GG and Tributyrin Supplementation Reduce Antibiotic-Induced Intestinal Injury, 2013, Journal of Parenteral and Enteral Nutrition, 37(6), 1-20 (Year: 2013).*
Malo, M. S. et al., Intestinal alkaline phosphatase preserves the normal homeostasis of gut microbiota, 2010, Gut, 59, 1476-1484 (Year: 2010).*
Ichim, T. et al., Experimental support for the effects of a probiotic/digestive enzyme supplement on serum cholesterol concentrations and the intestinal microbiome, 2016, Journal of Translational Medicine, 14(184), 1-9 (Year: 2016).*
Craciun, S. et al. Microbial conversion of choline to trimethylamine requires a glycyl radical enzyme, 2012, PNAS, 109(52): 21307-21312 (Year: 2012).*

(Continued)

*Primary Examiner* — Robert J Yamasaki
(74) *Attorney, Agent, or Firm* — Workman Nydegger

(57) ABSTRACT

An autobiotic composition includes a prebiotic component and postbiotic component. The prebiotic component is a substance resistant to digestion in the stomach and small intestine and selectively fermentable by microorganisms in the large intestine. The postbiotic component is a short-chain fatty acid, such as butyric acid, lactic acid, succinic acid, or salt or ester thereof, such as tributyrin. An autobiotic composition beneficially combines the microbiome-enhancing effects of a prebiotic with the intestinal healing effects of a postbiotic to provide overall benefits to digestive health. A seedbiotic component may form part of or be co-administered with the autobiotic composition. Enzymes may form part of or be co-administered with the autobiotic composition to enhance digestion of the prebiotic in the stomach and intestine and/or increase microbiome health. An exogenous ketone body component may form part of or be co-administered with the autobiotic composition.

19 Claims, 3 Drawing Sheets

(56) References Cited

U.S. PATENT DOCUMENTS

| | | | |
|---|---|---|---|
| 8,344,896 B2 | 1/2013 | Ozanne | |
| 8,426,468 B2 | 4/2013 | Henderson | |
| 8,642,654 B2 | 2/2014 | Clarke et al. | |
| 8,748,400 B2 | 6/2014 | Henderson | |
| 9,138,420 B2 | 9/2015 | D'Agostino et al. | |
| 9,211,275 B2 | 12/2015 | Clarke et al. | |
| 9,435,566 B2 | 9/2016 | Hill et al. | |
| 9,675,577 B2 | 6/2017 | D'Agostino et al. | |
| 9,717,767 B2 * | 8/2017 | Carpenter | A61P 37/08 |
| 9,795,580 B2 | 10/2017 | Weeber et al. | |
| 9,808,481 B2 | 11/2017 | Ritter et al. | |
| 9,925,164 B1 | 3/2018 | Hashim | |
| 9,957,246 B2 | 5/2018 | Stinchcomb et al. | |
| 10,022,409 B2 | 7/2018 | Carpenter et al. | |
| 10,051,880 B2 | 8/2018 | Clarke et al. | |
| 10,088,197 B2 | 10/2018 | Hamagami et al. | |
| 10,245,242 B1 | 4/2019 | Millet | |
| 10,245,243 B1 | 4/2019 | Millet | |
| 10,292,592 B2 | 5/2019 | Marshall et al. | |
| 10,407,331 B2 | 9/2019 | Kamito et al. | |
| 10,512,615 B1 | 12/2019 | Millet | |
| 10,588,876 B2 | 3/2020 | Millet | |
| 10,588,877 B2 | 3/2020 | Arnold | |
| 10,596,128 B2 | 3/2020 | Millet | |
| 10,596,129 B2 | 3/2020 | Millet | |
| 10,596,130 B2 | 3/2020 | Millet | |
| 10,596,131 B2 | 3/2020 | Millet | |
| 10,660,958 B2 | 5/2020 | Clarke | |
| 10,736,861 B2 | 8/2020 | Millet | |
| 10,792,269 B2 | 10/2020 | Hashim | |
| 10,925,843 B2 | 2/2021 | Millet | |
| 10,973,786 B2 | 4/2021 | Millet | |
| 10,980,764 B1 | 4/2021 | D'Agostino et al. | |
| 10,980,772 B2 | 4/2021 | Millet | |
| 11,020,362 B2 | 6/2021 | Millet | |
| 11,033,553 B2 | 6/2021 | Millet | |
| 11,103,470 B2 | 8/2021 | Millet | |
| 11,185,518 B2 | 11/2021 | Millet | |
| 11,202,769 B2 | 12/2021 | Millet | |
| 11,241,403 B2 | 2/2022 | Millet | |
| 11,690,817 B2 | 7/2023 | Millet | |
| 12,186,297 B2 | 1/2025 | Millet | |
| 12,251,362 B2 | 3/2025 | Lowery et al. | |
| 2001/0014696 A1 | 8/2001 | Veech | |
| 2001/0018866 A1 | 9/2001 | Fischer | |
| 2001/0041736 A1 | 11/2001 | Veech | |
| 2003/0022937 A1 | 1/2003 | Veech | |
| 2004/0138293 A1 | 7/2004 | Werner et al. | |
| 2005/0129783 A1 | 6/2005 | McCleary | |
| 2006/0165777 A1 | 7/2006 | Solomon et al. | |
| 2006/0275253 A1 | 12/2006 | Ushida et al. | |
| 2007/0029913 A1 | 2/2007 | Chen | |
| 2007/0135376 A1 | 6/2007 | Henderson | |
| 2007/0179197 A1 | 8/2007 | Henderson | |
| 2008/0058416 A1 | 3/2008 | Greenwood et al. | |
| 2008/0287372 A1 | 11/2008 | Henderson | |
| 2009/0131475 A1 | 5/2009 | Uesugi et al. | |
| 2009/0253781 A1 | 10/2009 | Veech | |
| 2010/0041751 A1 | 2/2010 | Henderson | |
| 2010/0056631 A1 | 3/2010 | Hisamura et al. | |
| 2010/0197758 A1 | 8/2010 | Andrews et al. | |
| 2010/0210726 A1 | 8/2010 | Kuriyama | |
| 2010/0298294 A1 | 11/2010 | Clarke | |
| 2011/0237666 A1 | 9/2011 | Clarke et al. | |
| 2011/0287114 A1 | 11/2011 | Johnson | |
| 2012/0053240 A1 | 3/2012 | Rathmacher et al. | |
| 2012/0071548 A1 | 3/2012 | Veech | |
| 2012/0171165 A1 | 7/2012 | Buck et al. | |
| 2012/0202891 A1 | 8/2012 | Stinchcomb et al. | |
| 2013/0079406 A1 | 3/2013 | Veech | |
| 2013/0337116 A1 * | 12/2013 | Petralia | A61P 3/02 426/61 |
| 2014/0256808 A1 | 9/2014 | Henderson | |
| 2014/0329893 A1 | 11/2014 | Veech | |
| 2014/0350105 A1 | 11/2014 | D'Agostino et al. | |
| 2014/0352728 A1 | 12/2014 | Svensson | |
| 2015/0065571 A1 | 3/2015 | Clarke et al. | |
| 2015/0132280 A1 | 5/2015 | Lopez et al. | |
| 2015/0144074 A1 | 5/2015 | Fujimoto et al. | |
| 2015/0320809 A1 | 11/2015 | Carpenter et al. | |
| 2015/0363750 A1 | 12/2015 | Svensson et al. | |
| 2016/0193173 A1 | 7/2016 | Clarke et al. | |
| 2016/0256411 A1 | 9/2016 | Aung-Din | |
| 2016/0263071 A1 | 9/2016 | Borges et al. | |
| 2017/0020844 A1 | 1/2017 | Galinski | |
| 2017/0029650 A1 | 2/2017 | Veling et al. | |
| 2017/0172969 A1 | 6/2017 | D'Agostino et al. | |
| 2017/0258745 A1 | 9/2017 | Millet | |
| 2017/0266148 A1 | 9/2017 | D'Agostino et al. | |
| 2017/0290792 A1 * | 10/2017 | Cavaleri | A61K 31/19 |
| 2017/0296501 A1 | 10/2017 | Lowery et al. | |
| 2017/0298339 A1 | 10/2017 | Hanson et al. | |
| 2017/0304564 A1 | 10/2017 | Dehaan et al. | |
| 2018/0021274 A1 | 1/2018 | Arnold | |
| 2018/0021281 A1 | 1/2018 | Berger | |
| 2018/0055797 A1 | 3/2018 | Llosa et al. | |
| 2018/0057846 A1 | 3/2018 | Llosa et al. | |
| 2018/0195096 A1 | 7/2018 | Veech et al. | |
| 2018/0214399 A1 | 8/2018 | Spector et al. | |
| 2018/0238586 A1 | 8/2018 | Sugatani et al. | |
| 2019/0099394 A1 | 4/2019 | Ari et al. | |
| 2019/0151267 A1 | 5/2019 | Millet | |
| 2019/0167613 A1 | 6/2019 | Millet | |
| 2019/0167614 A1 | 6/2019 | Millet | |
| 2019/0177673 A1 | 6/2019 | Llosa et al. | |
| 2019/0183220 A1 | 6/2019 | Takada | |
| 2019/0183820 A1 | 6/2019 | Millet | |
| 2019/0183821 A1 | 6/2019 | Millet | |
| 2019/0191755 A1 | 6/2019 | Garvey et al. | |
| 2019/0209501 A1 | 7/2019 | Tinsley, M. et al. | |
| 2019/0262293 A1 | 8/2019 | Millet | |
| 2019/0313682 A1 | 10/2019 | Nagel | |
| 2019/0321309 A1 | 10/2019 | Millet | |
| 2020/0078973 A1 | 3/2020 | Valeze et al. | |
| 2020/0140371 A1 | 5/2020 | Verdin et al. | |
| 2020/0253909 A1 | 8/2020 | Millet | |
| 2020/0268701 A1 | 8/2020 | D'Agostino et al. | |
| 2021/0095867 A1 | 4/2021 | Gururaja et al. | |
| 2021/0106168 A1 | 4/2021 | Cingolani et al. | |
| 2021/0205241 A1 | 7/2021 | Millet | |
| 2023/0346721 A1 | 11/2023 | Millet | |

FOREIGN PATENT DOCUMENTS

| | | |
|---|---|---|
| CN | 1256629 A | 6/2000 |
| CN | 1347319 | 5/2002 |
| CN | 1972698 A | 5/2007 |
| CN | 101674730 A | 3/2010 |
| CN | 101678043 A | 3/2010 |
| CN | 101969769 A | 2/2011 |
| CN | 102164884 A | 8/2011 |
| CN | 104224823 A | 12/2014 |
| CN | 105050594 A | 11/2015 |
| CN | 106038532 A | 10/2016 |
| CN | 106459646 A | 2/2017 |
| CN | 106858066 A | 6/2017 |
| CN | 108253621 A | 7/2018 |
| CN | 109480284 A | 3/2019 |
| DE | 102017210992 A1 | 1/2019 |
| EP | 0008700 A1 | 3/1980 |
| EP | 1112711 A1 | 7/2001 |
| EP | 1178748 A1 | 2/2002 |
| EP | 1827412 A1 | 9/2007 |
| EP | 1915144 A2 | 4/2008 |
| EP | 2283834 | 2/2011 |
| EP | 2976073 A1 | 1/2016 |
| EP | 3094321 A1 | 11/2016 |
| EP | 3366173 A2 | 8/2018 |
| EP | 3446045 A1 | 2/2019 |
| FR | 2997302 A1 | 5/2014 |
| GB | 2391493 A | 2/2004 |
| ID | 201701176 | 2/2017 |
| JP | 11060434 | 3/1999 |
| JP | 2002521330 | 7/2002 |

(56) References Cited

FOREIGN PATENT DOCUMENTS

| | | |
|---|---|---|
| JP | 2004-035417 A | 2/2004 |
| JP | 2015-042644 A | 3/2015 |
| JP | 2015-514104 A | 5/2015 |
| JP | 2015-102323 A | 6/2015 |
| JP | 2016-514725 A | 5/2016 |
| JP | 2016-121128 A | 7/2016 |
| JP | 2017-046688 A | 3/2017 |
| JP | 2020-502652 A | 1/2020 |
| JP | 2020-527583 A | 9/2020 |
| JP | 2021-504476 A | 2/2021 |
| JP | 2021-506294 A | 2/2021 |
| RU | 2345546 | 4/2008 |
| WO | WO8703808 | 7/1987 |
| WO | WO 98/41200 | 9/1998 |
| WO | 00/69315 A1 | 11/2000 |
| WO | WO 03/070823 | 8/2003 |
| WO | WO2005107724 | 11/2005 |
| WO | 2006/061624 A1 | 6/2006 |
| WO | WO2007115282 | 10/2007 |
| WO | WO2008005818 | 1/2008 |
| WO | WO 2008/021394 | 2/2008 |
| WO | WO 2008/024408 | 2/2008 |
| WO | 2009/089144 A1 | 7/2009 |
| WO | 2010/021766 A1 | 2/2010 |
| WO | WO2011101171 | 8/2011 |
| WO | 2013/057506 A1 | 4/2013 |
| WO | 2013/150153 A1 | 10/2013 |
| WO | WO 2014153416 | 9/2014 |
| WO | 2015/071811 A1 | 5/2015 |
| WO | 2015/156865 A1 | 10/2015 |
| WO | WO2016123229 | 8/2016 |
| WO | 2016/149687 A1 | 9/2016 |
| WO | 2017/156446 A1 | 9/2017 |
| WO | 2017/165443 A1 | 9/2017 |
| WO | 2017/165445 A1 | 9/2017 |
| WO | 2017/182664 A1 | 10/2017 |
| WO | WO 2017/208217 | 12/2017 |
| WO | 2018/055388 A1 | 3/2018 |
| WO | WO 2018/089863 | 5/2018 |
| WO | 2018/114309 A1 | 6/2018 |
| WO | 2018/175879 A1 | 9/2018 |
| WO | 2018/187324 A1 | 10/2018 |
| WO | 2018/187852 A1 | 10/2018 |
| WO | WO2019018683 | 1/2019 |
| WO | 2019/104082 A1 | 5/2019 |
| WO | 2019/108683 A1 | 6/2019 |
| WO | 2019/204148 A1 | 10/2019 |
| WO | 2019/237152 A1 | 12/2019 |
| WO | 2019245912 A1 | 12/2019 |

OTHER PUBLICATIONS

Holscher, H. Dietary fiber and prebiotics and the gastrointestinal microbiota, 2017, Gut Microbes, 8(2): 172-184 (Year: 2017).*
Grootaert, C. Comparison of prebiotic effects of arabinoxylan oligosaccharides and inulin in a simulator of the human intestinal microbial ecosystem, 2009, FEMS Microbiology Ecology, 69: 231-242 (Year: 2009).*
Walton, G. et al. A randomised, double-blind, placebo controlled cross-over study to determine the gastrointestinal effects of consumption of arabinoxylan-oligosaccharides enriched bread in healthy volunteers, 2012, Nutrition Journal, 11(36): 1-11 (Year: 2012).*
Sanchez, J. I. et al. Arabinoxylan-oligosaccharides (AXOS) affect the protein/carbohydrate fermentation balance and microbial population dynamics of the Simulator of Human Intestinal Microbial Ecosystem, 2009, Microbial Biotechnology, 2(1): 101-113 (Year: 2009).*
Slavin, J. Fiber and Prebiotics: Mechanisms and Health Benefits, 2013, Nutrients, 5: 1417-1425 (Year: 2013).*
The Medical Republic, 2018, Sustained Release Sodium Butyrate Supplement Now Available to Support Management of GI Disorders, https://medicalrepublic.com.au/ sustained-release-sodium-butyrate-supplement-now-available-support-management-gi-disorders/ 15791; newly cited (Year: 2018).*
Zaleski, A. et al., Butyric acid in irritable bowel syndrome, 2013, Prz Gastroenterol, 8(6), 350-353 (Year: 2013).*
Lonza, Duocap Capsules, Feb. 16, 2018, https://web.archive.org/web/20180216001656/https://www.capsugel.com/consumer-health-nutrition-products/duocap-capsules (Year: 2018).*
International Search Report and Written Opinion received for PCT Patent Application No. PCT/US2020/033159, mailed on Aug. 12, 2020, 9 pages.
Dietary Guidelines Recommendations at https://health.gov/our-work/food-nutrition/2015-2020-dietary-guidelines/guidelines/ appendix-7/ (2010) (retrieved from the internet Oct. 20, 2020) (Year: 2010).
Non-Final Office Action received for U.S. Appl. No. 16/381,202, mailed on Aug. 11, 2020, 8 pages.
Non-Final Office Action received for U.S. Appl. No. 16/720,211, mailed on Oct. 28, 2020, 14 pages.
Non-Final Rejection Mailed on Sep. 9, 2020 for U.S. Appl. No. 16/783,956.
Notice of Allowance received for U.S. Appl. No. 16/381,202, mailed on Nov. 10, 2020, 8 pages.
Office Action cited in U.S. Appl. No. 16/720,211 dated Oct. 28, 2020.
Office Action cited in U.S. Appl. No. 16/996,509 dated Oct. 26, 2020.
Parker, Steve, "Ketogenic Mediterraanean Diet: Version 2.3," Nov. 23, 2010, pp. 1-3. (Year: 2010).
Requirement for Restriction/Election received for U.S. Appl. No. 16/551,570, mailed on Sep. 28, 2020, 6 pages.
Clarke, et al., Kinetics, safety and tolerability of (R)-3-hydroxybutyl (R)-3-hydroxybutyrate in healthy adult subjects. Regul Toxicol Pharmacol. Aug. 2012;63(3):401-8.
First Examination Report for New Zealand Patent Application No. 711433 issued by the New Zealand Intellectual Property Office dated Mar. 10, 2016.
First Office Action issued by the Chinese State Intellectual Property Office on Nov. 4, 2016 for corresponding Chinese Patent Application No. 201480016818.0.
Hashim, Sarni A., et al., "Ketone body therapy: from the ketogenic diet to the oral administration of ketone ester", Journal of Lipid Research, vol. 55, 2014.
Karppanen et al., J. Human Hypertension (2005), vol. 19, pp. S10-S19. (Year: 2005).
Murray, Andrew J., et al. "Novel ketone diet enhances physical and cognitive performance", The FASEB Journal, Vo. Dec. 30, 2016.
Roeder, Lois M., et al. The Effects of Ketone Bodies, Bicarbonate, and Calcium on Hepatic Mitochondrial Ketogenesis. Archives of Biochemistry and Biophysics, vol. 217, No. 2, Sep. pp. 460-467, 1982.
Veech, et al., "Ketone Bodies Mimic the Life Span Extending Properties of Caloric Restriction", IUBMB Life Feb. 8, 2017.
Vorgerd, M. And J. Zange. Treatment of glycogenosys type V (McArdle disease) with creatine and ketogenic diet with clinical scores and with 31P-MRS on working leg muscle. Acta Myologica, 2007; XXVI; pp. 61-63.
Dolson, Laura. How to Test Your Blood for Ketones. Downloaded Apr. 1, 2015. http://lowcarbdiets.about.com/od/KetogenicDiets/a/How-to-Test-Blood-For-Ketones.htm.
Nova Max Plus Glucose and Ketone Testing with One Monitor. Downloaded Apr. 1, 2015. http://www.novacares.com/nova-max-plus/.
Serum Ketones Test. MedlinePlus Medical Encyclopedia. Downloaded Apr. 1, 2015. http://www.nlm.nih.gov/medlineplus/ency/article/003498.htm.
It Really is in Your Blood: Glucose to Ketone Ratios. Greymadder, Sep. 15, 2014. Downloaded Apr. 1, 2015. http://greymadder.net/2014/09/15/it-really-is-in-your-blood-glucose-to-ketone-ratios/.
Precision Xtra vs. NovaMax Plus: Ketone Meter Evaluation. Jimmy Moore's Livin' La Vida Low Carb Blog. Downloaded Apr. 1, 2015. http://livinlavidalowcarb.com/blog/precision-xtra-vs-novamax-plus-ketone-meter-evaluation/15918.
Kirsch, Jr et al. "Butanediol Induced Ketosis Increases Tolerance to Hypoxia in the Mouse." Stroke. 1980. Vol. 11, No. 5, pp. 506-513.

(56) References Cited

OTHER PUBLICATIONS

Kossoff, Eric H. et al. "Optimal Clinical Management of Children Receiving the Ketogenic Diet: Recommendations of the International Ketogenic Diet Study Group." Epilepsia, Feb. 2009;50(2):304-17. Epub Sep. 23, 2008.
Henderson, Samuel T. "Ketone Bodies as a Therapeutic for Alzheimer's Disease." Neurotherapeutics. Jul. 2008;5 3 3):470-80.
Veech, Richard L. "The Therapeutic Implications of Ketone Bodies: The Effects of Ketone Bodies in Pathological Conditions: Ketosis, Ketogenic Diet, Redox States, Insulin Resistance, and Mitochondrial Metabolism." Prostaglandins Leukot Essent Fatty Acids. Mar. 2004;70(3):309-19.
Krotkiewski, M. "Value of VLCD Supplementation with Medium Chain Triglycerides." I'nt J Obes Relat Metab Disord. Sep. 2001;25(9):1 393000.
PCT International Search Report and Written Opinion issued by the International Searching Authority on Jul. 15, 2014 or International Patent Application No. PCT/US2014/031237.
Parker, Steve, "Ketogenic Mediterranean Diet: Version 2.3," Nov. 23, 2010, pp. 1-3. (Year: 2010).
Sajewicz et al. in Journal of Liquid Chromatography & Related Technologies, 33:1047-1057 (2010) (Year: 2010).
James, "Optical Purity and Enantiomeric Excess" at https://www.masterorganicchemistry.com/2017/02/24/optical-purity-and-enantiomeric-excess/. (Retrieved from the internet Nov. 6, 2018) (Year: 2018).
Tisdale, "Reduction of weight loss and tumour size in a cachexia model by a high fat diet", British Journal of Cancer, Jul. 1987, vol. 56, p. 39-43.
Tanaka, J., et al., "Significance of Blood Ketone Body Ration as an indicator of Hepatic Cellular Energy Status in Jaundiced Rabbits", Gastroenterology, 1979, vol. 76, No. 4, pp. 691-696.
Written Opinion cited in PCT/US19/27214 dated Jun. 25, 2019.
International Search Report cited in PCT/US18/62093 dated Feb. 1, 2019.
International Search Report cited in PCT/US18/62096 dated Feb. 11, 2019.
Pubchem, "Acetoacetic acid" Electronic Resource: https://pubchem.ncbi.nim.nih.gov/compound/Acetoacetic-acid, Retrieved on Sep. 3, 2019.
Arendash et al. "Caffeine and Coffee as Therapeutics Against Alzheimer's Disease", Journal of Alzheimer's Disease 20, 2010, S117-S126.
Kesl, et al., "Effects of exogenous ketone supplementation on blood ketone, glucose, triglyceride, and lipoprotein levels in Sprague-Dawley rats", Nutrition & Metabolism (2016).
Extended European Search Report issued in PCT/US2017021886 dated Oct. 17, 2019.
International Search Report and Written Opinion issued in PCT/US19/48364 dated Nov. 15, 2019.
International Search Report and Written Opinion issued in PCT/US19/48357 dated Nov. 18, 2019.
Karppanen, H., et al., "Why and how to implement sodium, potassium, calcium, and magnesium changes in food items and diets?".
International Search Report and Written Opinion issued in PCT/US20/16952 dated Apr. 22, 2020.
International Search Report and Written Opinion issued in PCT/US20/17555 dated May 4, 2020.
International Search Report and Written Opinion issued in PCT/US20/17556 dated May 4, 2020.
International Search Report and Written Opinion issued in PCT/US20/17552 dated May 4, 2020.
U.S. Appl. No. 14/455,385, filed Jan. 2, 2015, Office Action.
U.S. Appl. No. 14/860,092, filed Mar. 9, 2016, Office Action.
U.S. Appl. No. 14/860,092, filed Oct. 17, 2016, Office Action.
U.S. Appl. No. 15/610,668, filed Jul. 25, 2018, Office Action.
U.S. Appl. No. 15/454,157, filed Jan. 11, 2018, Office Action.
U.S. Appl. No. 15/454,157, filed Jun. 13, 2018, Office Action.
U.S. Appl. No. 15/936,820, filed Nov. 14, 2018, Office Action.
U.S. Appl. No. 15/936,849, filed Nov. 14, 2018, Office Action.
U.S. Appl. No. 15/454,157, filed Feb. 26, 2019, Notice of Allowance.
U.S. Appl. No. 15/936,849, filed Jan. 24, 2019, Notice of Allowance.
U.S. Appl. No. 16/272,328, filed Jul. 29, 2019, Office Action.
U.S. Appl. No. 16/272,359, filed Feb. 11, 2019, Notice of Allowance.
U.S. Appl. No. 16/381,202, filed Oct. 22, 2019, Office Action.
U.S. Appl. No. 16/224,485, filed Nov. 27, 2019, Notice of Allowance.
U.S. Appl. No. 16/224,408, filed Nov. 27, 2019, Notice of Allowance.
U.S. Appl. No. 16/272,145, filed Jan. 10, 2020, Office Action.
U.S. Appl. No. 16/409,501, filed Jan. 14, 2020, Notice of Allowance.
Amazon, "Perfect Keto Perform Pre Workout Powder—Burn Fat for Fuel Energy Supplement Drink Mix for Men and Women—Keto Friendly with Ketone Salts, BCAA, Nitric Oxide & MCT", Sep. 25, 2017 entire document especially p. 1 Retrieved from https://www.amazon.com/Perfect-Keto-Perform-PreworkoutSupplement/dp/B0751379Q9/ref=sr_1_9?dchild=1&keywords=ketone+pre+workout&qid=1597938465&sr=8-9.
Holtzman et al., "Role of adenosine receptors in caffeine tolerance", J. Pharmacol. Exp. Ther., 1991 ;256(1):62-68.
International Search Report and Written Opinion received for PCT Patent Application No. PCT/US20/37289, mailed on Sep. 30, 2020, 8 pages.
Acetoacetate, Acetone, and Dibenzylamine (A Contaminant in L-(+)-Beta-Hydroxybutyrate) Exhibit Direct Anticonvulsant Actions in Vivo, Epilepsia, Raven Press Ltd, New York, US, vol. 43, No. 4, Apr. 1, 2002 (Apr. 1, 2002), pp. 358-361.
Haces M L et al: "Antioxidant capacity contributes to protection of ketone bodies against oxidative damage induced during hypoglycemic conditions", Experimental Neurology, Elsevier, Amsterdam, NL, vol. 211, No. 1, May 1, 2008 (May 1, 2008), pp. 85-96.
Stubbs et al., "On the Metabolism of Exogenous Ketones in Humans", frontiers in Physiology, vol. 8, 2017, 13 pages.
Tsai et al., "Stereoselective effects of 3-hydroxybutyrate on glucose utilization of rat cardiomyocytes" life Sciences 78(2006) pp. 1385-1391.
A New Toy Measuring Blood Ketones. Diet Doctor, Aug. 21, 2012. Downloaded Apr. 1, 2015. http://www.dietdoctor.com/a-new-toy-measuring-blood-ketoones.
Bastin et al., "Salt Slection and Optimisation Procedures for Pharmaceutical New Chemical Entities", American Chemical Society and The Royal Society of Chemistry, vol. 4, No. 5, 2000, pp. 427-435.
Dolson, Laura. How to Test Your Blood for Ketones. Downloaded Apr. 1, 2015. http://lowcarbdiets.about.eom/od/KetogenicDiets/a/How-to-Test-Blood-For Ketones.htm.
Haywood A, Glass BD. Pharmaceutical excipients—where do we begin? Australian Prescriber. 2011; 34:112-114.
International Preliminary Report on Patentability received for PCT Patent Application No. PCT/US2019/048364, mailed on Mar. 11, 2021, 7 pages.
International Search Report and Written Opinion received for PCT Patent Application No. PCT/US21/17078, mailed or Apr. 23, 2021, 9 pages.
Robson et al. Expert Opin. Drug Saf. (2011), vol. 10, pp. 675-685 (Year: 2011).
Vandenberghe et al. in Can. J. Physiol. Pharmacol. 95: 455-458 (2017) (Published at www.nrcresearchpress.com/cjpp on Nov. 25, 2016). (Year: 2016).
Amazon, "Perfect Keto Perform Pre Workout Powder—Burn Fat for Fuel Energy Supplement Drink Mix for Men and Women—Keto Friendly with Ketone Salts, BCAA, Nitric Oxide & MCT", Sep. 25, 2017 entire document especially p. 1 Retrieved from https://www.amazon.com/Perfect-Keto-Perform-PreworkoutSupplement/dp/B0751379Q9/ref=sr_1_9?dchild=1&keywords=ketone+pre+workout&qid=1597938465&sr=8-9.
Extended European Search Report received for EP Patent Application No. 19788264.0, mailed on Dec. 20, 2021, 11 pages.

(56) References Cited

OTHER PUBLICATIONS

International Preliminary Report on Patentability received for PCT Patent Application No. PCT/US20/37289, mailed on Dec. 30, 2021, 6 pages.
International Search Report and Written Opinion received for PCT Patent Application No. PCT/US21/045186, mailed on Nov. 22, 2021, 10 pages.
Kim Do Young et al., "Ketone bodies are protective against oxidative stress in neocortical neurons," Journal of Neurochemistry, vol. 101, Issue 5, Jun. 1, 2007, pp. 1316-1326.
Maalouf M et al., "Ketones inhibit mitochondrial production of reactive oxygen species production following glutamate excitotoxicity by increasing NADH oxidation," Neuroscience, New York, NY, US, vol. 145, Issue 1, Mar. 2, 2007, pp. 256-264.
Maalouf M et al., "The neuroprotective properties of calorie restriction, the ketogenic diet, and ketone bodies," Brain Research Reviews, Elsevier, NL, vol. 59, No. 2, Mar. 1, 2009, pp. 293-315.
Pete J Cox et al., "Acute nutritional ketosis: implications for exercise performance and metabolism," Extreme Physiology & Medicine, vol. 3, Issue 1, Dec. 1, 2014, pp. 1-9.
Blazquez et al. Journal of Neurochemistry, 1999, vol. 72 No. 4, pp. 1759-1768. (Year: 1999).
International Preliminary Report on Patentability received for PCT Patent Application No. PCT/US2020/016952, mailed on Aug. 26, 2021, 7 pages.
International Preliminary Report on Patentability received for PCT Patent Application No. PCT/US2020/017552, mailed on Aug. 26, 2021, 7 pages.
International Preliminary Report on Patentability received for PCT Patent Application No. PCT/US2020/017555, mailed on Aug. 26, 2021, 7 pages.
International Preliminary Report on Patentability received for PCT Patent Application No. PCT/US2020/017556, mailed on Aug. 26, 2021, 7 pages.
International Preliminary Report on Patentability received for PCT Patent Application No. PCT/US2020/033159, mailed on Nov. 25, 2021, 6 pages.
International Search Report and Written Opinion received for PCT Patent Application No. PCT/US20/017555, mailed on May 4, 2020, 8 pages.
European Search Report received for EP Patent Application No. 20755289.4, mailed on Oct. 11, 2022, 7 pages.
European Search Report received for EP Patent Application No. 20755994.9, mailed on Sep. 21, 2022, 6 pages.
Extended European Search Report received for EP Patent Application No. 20755770.3, mailed on Sep. 1, 2022, 7 pages.
International Preliminary Report on Patentability received for PCT Patent Application No. PCT/US2021/017078, mailed on Aug. 18, 2022, 7 pages.
International Search Report and Written Opinion received for PCT Patent Application No. PCT/US2021/063559, mailed on Mar. 18, 2022, 9 pages.
International Search Report cited in PCT/US19/27214 dated Jun. 25, 2019.
John C Newman et al: "beta-Hydroxybutyrate: A Signaling Metabolite", Annual Review of Nutrition, vol. 37, Aug. 21, 2017 (Aug. 21, 2017), pp. 51-76, XP055771586.
Lile et al. Drug Alcohol Depend. 2012, 122 (1-2), 61-69.
National Center for Biotechnology Information. PubChem Compound Summary for CID 441, 3-Hydroxybutyric acid, https://pubchem.ncbi.nlm.nih.gov/compound/3-Hydroxybutyric acid. (Year: 2005).
Shigeno et al. in Biosci. Biotech. Biochem., 56(2), 320-323 (1992) (Year: 1992).
European Search Report received for EP Patent Application No. 20805593.9, mailed on Dec. 16, 2022, 9 pages.
Maguire et al., "Gut dysbiosis, leaky gut, and intestinal epithelial proliferation in neurological disorders: towards the development of a new therapeutic using amino acids, prebiotics, probiotics, and postbiotics", Rev Neurosci. Jan. 28, 2019, vol. 30, No. 2, pp. 179-201.
Rich A.J., "Ketone Bodies as Substrates," Proceedings of the Nutrition Society (1990), vol. 49, 361-373.
Wu et al., "Medium-Chain Triglycerides in Infant Formulas and Their Relation to Plasma Ketone Body Concentrations," Pediatric Research, vol. 20, No. 4, (1986), pp. 338-341.
Yang Y. et al., Role of Adherent-Invasive *Escherichia coli* in Inflammatory Bowel Disease, Letters in Biotechnology, No. 06, Nov. 30, 2016.
International Preliminary Report on Patentability received for PCT Patent Application No. PCT/US2018/062093, mailed on Jun. 4, 2020, 6 pages.
International Preliminary Report on Patentability received for PCT Patent Application No. PCT/US2021/045186, mailed on Mar. 9, 2023, 7 pages.
International Preliminary Report on Patentability received for PCT Patent Application No. PCT/US2021/050302, mailed on Mar. 2, 2023, 8 pages.
Sorensen et al. ("Simultaneous determination of ß-hydroxybutyrate and ß-hydroxy-ß-methylbutyrate in human whole blood using hydrophilic interaction liquid chromatography electrospray tandem mass spectrometry", Clinical Biochemistry, 2013, vol. 46, pp. 1877-1883) (Year: 2013).
Anonymous: "Blue Lemon Ice Advanced Formula", MINTEL, Database accession No. 4315637, 2016, pp. 3.
Anonymous: "Strawberry Pineapple Flavour Pre-Exertion Performance Optimizer", MINTEL, Database accession No. 5661617, 2018, pp. 4.
Arnold, Instant Ketosis?, (2013), Aug. 4, 2013 (retrieved on Apr. 21, 2017), p. 1-3. Retrieved from the internet; URL: <http://patrickarnoldblog.com/instant-ketosis/. (Year: 2013).
Bala et al. Drug Invention Today. Jun. 1, 2018;10(6), 929-931.
Budin. N et al., "Efficient synthesis of the ketone body ester (R)-3-hydroxybutyryl-(R)-3-hydroxybutyrate and its (S, S) enantiomer," Bioorganic Chemistry, vol. 80, Oct. 2018, pp. 560-564.
Huang Dexiang et al., "Clinical Intravenous Nutrition", Shanghai Medical University Press Jan. 31, 1994, pp. 121-124.
International Preliminary Report on Patentability received for PCT Patent Application No. PCT/US2014/031237, mailed on Oct. 1, 2015, 8 pages.
International Preliminary Report on Patentability received for PCT Patent Application No. PCT/US2017/021886, mailed on Sep. 20, 2018, 9 pages.
International Preliminary Report on Patentability received for PCT Patent Application No. PCT/US2018/062096, mailed on Jul. 2, 2020, 8 pages.
International Preliminary Report on Patentability received for PCT Patent Application No. PCT/US2019/027214, mailed on Oct. 29, 2020, 09 pages.
International Preliminary Report on Patentability received for PCT Patent Application No. PCT/US2019/048357, mailed on Mar. 11, 2021, 08 pages.
International Preliminary Report on Patentability received for PCT Patent Application No. PCT/US2021/063559, mailed on Jul. 6, 2023, 6 pages.
International Search Report and Written Opinion received for PCT Patent Application No. PCT/US2014/031237, mailed on Jul. 15, 2014, 11 pages.
International Search Report and Written Opinion received for PCT Patent Application No. PCT/US2017/021886, mailed on Jun. 1, 2017, 15 pages.
International Search Report and Written Opinion received for PCT Patent Application No. PCT/US2018/062096, mailed on Feb. 11, 2019, 13 pages.
International Search Report and Written Opinion received for PCT Patent Application No. PCT/US2019/027214, mailed on Jun. 25, 2019, 14 pages.
International Search Report and Written Opinion received for PCT Patent Application No. PCT/US2019/048357, mailed on Nov. 18, 2019, 13 pages.

(56) References Cited

OTHER PUBLICATIONS

International Search Report and Written Opinion received for PCT Patent Application No. PCT/US2020/016952, mailed on Apr. 22, 2020, 9 pages.

International Search Report and Written Opinion received for PCT Patent Application No. PCT/US2020/017552, mailed on May 4, 2020, 9 pages.

International Search Report and Written Opinion received for PCT Patent Application No. PCT/US2020/017556, mailed on May 4, 2020, 12 pages.

Kaster M.P. et al, "Caffeine acts through neuronal adenosine A2A receptors to prevent mood and memory dysfunction triggered by chronic stress", Proceedings of the National Academy of Sciences, vol. 112, No. 25, Jun. 8, 2015, pp. 7833-7838.

Kesl, et al., "Effects of exogenous ketone supplementation on blood ketone, glucose, triglyceride, and lipoprotein levels in Spraque-Dawley rats", Nutrition & Metabolism (2016).

Lang Chaochun, "Healthy fitness and exercise prescription", Nov. 30, 2013, p. 201.

Luis Villasenor, "Supplements and Ketogenic Diets—Facts and Myths", Retrieved from https://www.ketogains.com/2015/09/supplements-and-ketogenic-diets-facts-and-myths/, Sep. 18, 2015, pp. 15.

Lytra. G. et al., "Distribution and Organoleptic Impact of Ethyl 3-Hydroxybutanoate Enantiomers in Wine," J. Agric. Food Chem, vol. 63, Issue 48, 2015, pp. 10484-10491.

Mangels D.R. et al., "Catechins as Potential Mediators of Cardiovascular Health", Translational Sciences, vol. 37, No. 5, May 1, 2017, pp. 757-763.

O'Meara, Cyndi, Changing Habits, Ketosis—Can we achieve it in a pill?, https://changinghabits.com.au/ketosis-can-we-achieve-it-in-a-pill/, 12 pages, (Jan. 13, 2017).

Office Action received for European Patent Application No. 20805593.9, mailed on Dec. 22, 2023, 7 pages.

Sara, How do you know which product is right for you? How to choose exogenous ketones, https://ketosupplements.co.uk/how-to-choose-exogenous-ketones/, 10 pages, (Sep. 25, 2017).

Short, Jay, Effects of A Ketone/Caffeine Supplement On Cycling and Cognitive Performance, Master's thesis, Ohio State University, 61 pages, (Jan. 1, 2017).

Yang Yue et al., "Research on sarcopenic obesity", Chinese Journal of Modern Medicine, vol. 20, No., 3, Mar. 25, 2018, pp. 98-101.

Yang Zeyi, "Biochemistry of sports nutrition scientific research progress", Mar. 31, 2004, vol. 23, No. 2, pp. 158-165.

Zeng Jing et al., "B-hydroxy-3-methyl—The clinical effects and mechanism", vol. 2, No. 2, Jun. 9, 2015, pp. 57-62.

Database GNPD MINTEL, Sep. 29, 2016, anonymous, "Blue Lemon Ice Advanced Formula", XP093048090, Database accession No. 4315637, pp. 3.

European Search Report received for EP Patent Application No. 21750261.6, mailed on Feb. 2, 2024, 10 pages.

O'Mailey et al, Appl. Physiol. Nutr. Metab. 42: 1031-1035 (2017) Published at www.NRCRESEARCHPRESS.com/APNM on Jul. 27, 2017.

Office Action received for European Patent Application No. 19788264.0, mailed on Mar. 13, 2024, 5 pages.

WO2009045481, Pan et al. Published Apr. 9, 2009 Listed in this section as citation type "foreign" does not allow for any appropriate country code for "WO" documents.

D'Souza et al. Neuropsychopharmacology 2004, 29, 1558-1572.

Lee, S et al. Strategic Approaches for Colon Targeted Drug Delivery: An Overview of Recent Advancements, 2020, Pharmaceutics, 12(68): 1-20 (Year: 2020).

Lincoln et al. Archives of Biochemistry and Biophysics 1987, 259 (1), 149-156.

Maroni, A et al. Enteric coatings for colonic drug delivery: state of the art, 2017, Expert Opinion on Drug Delivery, 14 (9): 1027-1029 (Year: 2017).

Patel, R et al. Therapeutic Use of Prebiotics, Probiotics, and Postbiotics to Prevent Necrotizing Enterocolitis: What is the Current Evidence? 2014, Clinics in Perinatology, 40(1): 11-25 (Year: 2014).

U.S. Appl. No. 62/324,798, filed 2016-04-19, Lowery, priority document to U.S. Pat. No. 11173138.

\* cited by examiner

AUTOBIOTIC COMPOSITIONS AND METHOD FOR PROMOTING HEALTHY GUT MICROBIOME

CROSS-REFERENCE TO RELATED APPLICATIONS

This Application claims the benefit of U.S. Provisional Patent Application No. 62/848,039, filed May 15, 2019, the disclosure of which is incorporated herein by reference in its entirety.

BACKGROUND

Excessive intestinal permeability, also referred to as "increased intestinal permeability" or "leaky gut syndrome," is a condition characterized by an unhealthy and overly permeable intestinal lining. A typical adult digestive system includes approximately 4,000 square feet of intestinal lining. When functioning properly, the intestinal lining tightly controls what gets absorbed from the digestive tract into the bloodstream. The "tight junctions" of the intestinal lining play a primary role in this important function.

Ideally, the intestinal lining selectively absorbs needed nutrients into the bloodstream while preventing passage of undesirable substances such as pathogens, undigested food particles, toxins, and antigens. Inflammation and/or microtrauma of the intestinal lining can result in dysfunction in these selective barrier effects, resulting in less effective absorption of nutrients and/or increased passage of undesirable substances into the bloodstream. Modern lifestyles, which often involve high stress and diets with excessive sugar and processed foods, are believed to contribute to inflammation of the digestive tract and thereby negatively impact the ability of the intestinal lining to properly regulate absorption.

The inflammation and trauma associated with excessive intestinal permeability can also negatively affect the gut microbiome, and disruption of the gut microbiome can further aggravate the intestinal lining. A properly functioning microbiome helps the body digest certain foods, produces certain vitamins such as vitamin K and certain B vitamins, and limits colonization of unwanted, pathogenic microorganisms by competing for available space and resources. A loss of diversity or other impairment of the gut microbiome is sometimes referred to as "dysbiosis."

In addition, sustained periods of dysbiosis can involve the overproduction of toxic and/or carcinogenic metabolites. Overgrowth of some bacterial colonies, at the expense of others, reduces the microbial diversity of the gut microbiome and thereby leads to increased production of certain waste byproducts. Normal removal mechanisms may be overwhelmed by these higher levels, leading to additional stresses to the body.

As with increased intestinal permeability, gut dysbiosis can be caused by poor diet and/or high stress. It may also occur as a side-effect of antibiotic therapy, which disrupts the natural balance of gut bacteria and may lead to overgrowth of one or more types of bacteria previously kept in check by others. Clostridium difficile infection is one example of a potentially dangerous form of dysbiosis that can result from antibiotic therapy.

Increased intestinal permeability and/or gut dysbiosis may be associated with digestive conditions such as celiac disease, Crohn's disease, irritable bowel syndrome (IBS), inflammatory bowel disease, and colitis. The negative effects may extend beyond the digestive system, however. Increased intestinal permeability and/or gut dysbiosis may also be associated with conditions such as eczema, rheumatoid arthritis, lupus, multiple sclerosis, fibromyalgia, asthma, and even obesity.

Problems associated with the digestive system can also affect cognition and mood. The digestive system includes millions of nerve cells that line the gastrointestinal tract and make up the enteric nervous system (ENS). The ENS is in continuous communication with the central nervous system (CNS), a phenomenon sometimes referred to as the "gut-brain axis" or "gut-brain connection." The bidirectional communication between the gut and the brain occurs through various pathways, including the vagus nerve, neuroimmune pathways, and neuroendocrine pathways.

Irritation in the digestive system can result in signals to the CNS that trigger changes to mood and/or cognition. Due to this gut-brain connection, increased intestinal permeability and/or gut dysbiosis may be associated with or may aggravate mood and/or cognition problems such as anxiety, depression, and attention disorders.

Increased intestinal permeability and gut dysbiosis are notoriously difficult to treat. These conditions can cause a "vicious cycle" where the symptoms of the condition cause increased stress and malnutrition, which in turn can further aggravate the intestinal lining, further disrupt the gut microbiome, and result in more pronounced symptoms. In addition, because of the gut-brain connection, the mental stresses associated with the symptoms tend to form a positive feedback loop that further aggravate the digestive system. Moreover, once an imbalance in the gut microbiome begins, such imbalance tends to increase because there are fewer and fewer beneficial microbes present to compete with the overgrowing non-beneficial types.

Many people take probiotics with the belief that it will create a healthier gut biome. While probiotics can be helpful in some cases, such as where a person's gut biome has been weakened by antibiotics or other temporary exogenous factors, probiotics often have no beneficial effect and can in fact be detrimental and cause harm. Side effects of taking probiotics include gas, headaches, diarrhea, bloating, constipation, excessive sinus drainage, abdominal discomfort, and allergic reactions. These side effects may be magnified in subjects with serious gastrointestinal issues, younger and older persons (due to less robust immune systems), and those with a damaged immune system.

When a person's microbiome is out of balance, administering probiotics may be ineffective in restoring the proper balance. In some cases, it can exacerbate the imbalance if the probiotic competes with and weakens an already weakened microbial strain that is important for good health. Research shows there are many thousands of different types of bacteria in people's microbiomes. Each individual person might have 150-250 types in their gut. People with diseases generally have a less diverse microbiome. closer to 150 than 250 types. Administering *Lactobacillus* probiotics can be useful in reducing the population of pathogenic bacteria by secreting bacteriostatic and/or bactericidal molecules. However, when a person already has healthy quantities of *Lactobacillus*, administering *Lactobacillus* probiotics may negatively compete with and further destroy colonies of healthy microbes that are already too low in number.

A twin adult study in the UK determined that gut health is associated with teams of bacteria. While research has mainly focused on the health effects of single microbial species, a new study reveals that microbial teamwork is actually more important than a single species working alone. Microbial functions were found to be more important than single microbes, as they showed a larger number of associations with the molecular composition of both gut and blood environments. Almost half the molecules measured in blood also showed an association with gut microbes, with microbial functions carried out by microbial teams showing eight-fold more associations than individual species. It is hypothesized that an extensive dialog goes on between the gut environment and our blood, which explains why gut microbes are strongly linked to our health.

In people with weakened immune systems (e.g., those with a terminal illness, HIV, seniors, and infants), the body's immune system may see probiotic microbes as invading pathogens and go on the attack. In some cases, they can induce a potentially fatal condition called *Lactobacillus septicaemia*. Subjects with autoimmune diseases may suffer adverse effects when taking probiotics.

The Dutch Food and Consumer Product Safety Authority now recommends that probiotics not be used to treat seriously ill patients. One study at the University Medical Centre in Utrecht, Netherlands, showed that 12% of patients with acute pancreatitis died after being given genetically modified strains of probiotic bacteria during a trial conducted there. The researchers concluded that extremely ill persons should avoid probiotics.

Accordingly, there is an ongoing need for compositions and methods that are capable of providing the necessary components to help the body heal excessive intestinal permeability and the intestinal lining, providing the body the ability to build its own personal and healthier gut microbiome, resulting in reduced gut dysbiosis and reduced inflammation, resulting in improved overall health and even improved cognition and/or mood.

SUMMARY

The present disclosure relates to "autobiotic" compositions and methods that are formulated and designed to enhance a subject's own endogenous ability to create their own personal, healthy and optimized microbiome "automatically" without necessarily requiring supplementation with an exogenous probiotic.

An autobiotic composition comprises a prebiotic component and a postbiotic component and is formulated to provide synergistic health benefits that are greater than supplementation with a prebiotic or postbiotic in isolation.

An autobiotic composition is tailored to allow for self-optimization of a subject's personal microbiome according to individual conditions that may be unique to the subject. As opposed to conventional probiotic compositions, which are administered somewhat blindly with the hope that the included microorganisms will benefit the subject's microbiome, an autobiotic composition is formulated to work with and optimize the microbial population already nascent within the subject and which the subject is already able to effectively support.

For example, variations in the microbiome are known to be partially influenced by an individual's genetics and/or epigenetics (see, e.g., Qin and Wade, "Crosstalk between the microbiome and epigenome: messages from bugs" *J. Biochem.* 2018 February; 163(2): 105-112), and thus blindly supplementing one's gut biome with probiotics may amount to forcing an individual's microbiome away from a microbiome the individual is able to support or that is most beneficial to the individual. Any benefits from such probiotic supplementation could thus be coincidental, short-lived, and unsustainable. At worst, probiotic supplementation could move one's gut microbiome away from a healthy state, causing or exacerbating other health issues in the subject. The autobiotic compositions described herein are formulated to avoid such issues surrounding conventional probiotic therapy, and in contrast are designed to promote self-optimization of the microbiome for a sustainable and long-term solution that also minimizes potential unintended side effects.

The prebiotic component may be a digestion-resistant substrate that is fermentable by microorganisms of the large intestine, such as fructans, galactans, inulin, xylans, acacia fiber, vegetable fibers, fruit fibers, grain fibers, *psyllium* husk fibers, other plant-based fibers, resistant starches, glucans, beta-glucans, cellulose, pectin, and combinations thereof. The prebiotic component functions at least in part to enhance a subject's microbiome by providing a fermentation substrate usable by beneficial gut microbiota. Enzymes can optionally be included that assist in breaking down the prebiotic component, typically in the stomach, small intestines, and large intestines. Other enzymes beneficial to the microbiome can be delivered to the intestines to improve microbiome health.

The postbiotic component is an exogenous form of fermentation byproducts generated by the microbiota in a healthy colon, and/or compounds that readily convert to such byproducts after ingestion. The postbiotic component functions at least in part to support the health and function of the intestinal lining, including the microbiota. One example of a postbiotic is butyrate (or the free acid version butyric acid) and/or an ester thereof, such as tributyrin. Tributyrin is particularly preferred as it may better enable delivery of butyrate groups to the target anatomy of the large intestine where it can be effective, whereas with an unbound butyrate, much may be degraded or used in the stomach and small intestine prior to reaching the targeted large intestine.

Butyrate acts as a signal to suppress appetite, is utilized by microbiota, and serves as the primary energy source of colonocytes, making butyrate a mutually beneficial supplement. Other useful postbiotic compounds are those which are typically produced by bacteria as fermentation products, including but not limited to lactate, succinate, and formate, which are used by the bacteria themselves to proliferate and survive.

Autobiotic compositions described herein beneficially combine the microbiome-enhancing effects of a prebiotic with the intestinal healing effects of a postbiotic to synergistically provide increased overall benefits to digestive health not possible with administration of either component in isolation. Autobiotic compositions may also benefit mood, memory, and/or cognition via influences on the CNS by way of the gut-brain axis.

In preferred embodiments, the autobiotic composition omits or is substantially free of probiotic formulations. Nevertheless, some embodiments may include a probiotic component in circumstances where a subject may have a particular need thereof or is determined to have such a need, such as where the subject has undergone recent antibiotic therapy or is otherwise deficient in a critical subset or portion of a healthy microbiome. In such circumstances, the probiotic component is preferably provided as a "seedbiotic" or a portion thereof, as opposed to a conventional probiotic dosage regimen. That is, the seedbiotic is formulated to provide just enough of the right "seed" bacteria to allow for effective utilization of the autobiotic components in the microbiome. The seedbiotic component is then minimized or eliminated as soon as possible to allow for the establishment of a self-sufficient, functionally optimized microbiome that does not require a continuous influx of exogenous probiotics, thereby minimizing the negative side effects of exogenous probiotic consumption.

It is to be understood that both the foregoing general description and the following detailed description are exemplary and explanatory only and are not restrictive of the embodiments claimed.

BRIEF DESCRIPTION OF THE DRAWINGS

Various objects, features, characteristics and advantages of the invention will become apparent and more readily appreciated from the following description of the embodiments, taken in conjunction with the accompanying drawings and the appended claims, all of which form a part of this specification wherein like reference numerals designate corresponding parts in the various figures and wherein the various elements depicted are not necessarily drawn to scale; and wherein:

DETAILED DESCRIPTION

I. Definitions

Figure 1:
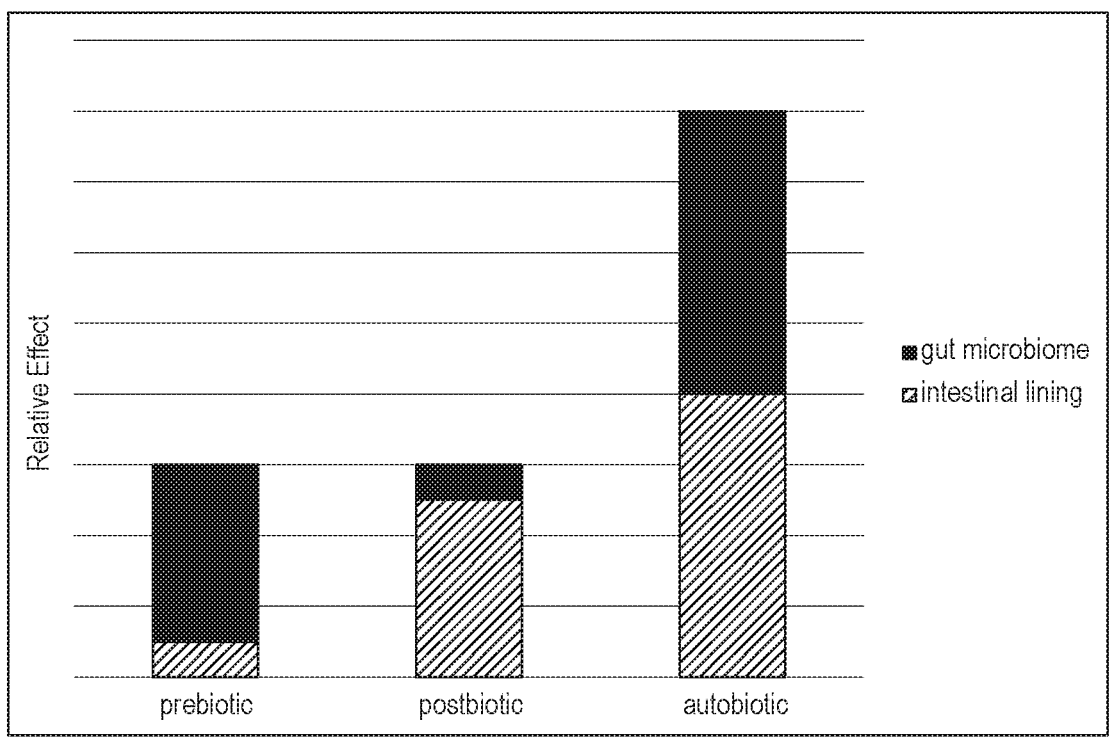
FIG. 1 is a graph that conceptually compares expected positive effects on a relative scale of a prebiotic, a postbiotic, and an autobiotic that combines a prebiotic component and a postbiotic component (in the same amounts as the prebiotic and postbiotic)

The term "autobiotic" refers to a composition that combines a prebiotic component and a postbiotic component into a single dosage form, or a treatment regimen in which a prebiotic component and a postbiotic component are co-administered to a subject. As explained herein, an autobiotic is formulated to enhance and optimize a subject's own personal microbiome "automatically" without necessarily requiring additional supplementation of an exogenous probiotic, though some embodiments may include a limited amount of a probiotic as a "seedbiotic" for use under certain circumstances (e.g., to rebalance a person's microbiota).

As explained in greater detail below, preferred embodiments minimize or omit probiotics. Subjects are unique and what may be beneficial to one subject's microbiome may be ineffective or potentially even harmful to another's. The makeup of an effective microbiome, for a given individual, cannot always be presupposed. Thus, preferred autobiotic compositions omit probiotics, and the associated guesswork involved, to instead focus on supporting the potential of a subject's own personal biota.

The term "prebiotic" refers to ingestible substances that generally function as a substrate to selectively induce the growth of beneficial microorganisms within the digestive tract, and in particular within the large intestine. Prebiotics are typically resistant to digestion within the stomach and small intestine and are selectively fermented by microorganisms within the large intestine. Examples of prebiotics include digestive-resistant oligosaccharides such as fructans (e.g., fructooligosaccharides (FOS), inulin) and galactans (e.g., galactooligosaccharides (GOS)), glucans, resistant starches (e.g., sourced from legumes, potatoes, or unripe bananas), beta-glucan, xylans (e.g., xylooligosaccharides (XOS)), acacia fiber, *psyllium* husks, vegetable fibers, fruit fibers, grain fibers, other plant-based fibers, cellulose, or pectin).

The term "postbiotic" refers to a substance that comprises one or more large intestine fermentation products, including lactic acid, succinate, formate and short-chain fatty acids (SCFAs), or a molecule that may be readily converted to a short-chain fatty acid within the large intestine. Preferred postbiotics comprise one or more short-chain fatty acids or esters thereof, in particular butyric acid. The butyric acid may be provided in the free acid form, or in its deprotonated form (i.e., butyrate) as a salt or ester. Particularly preferred examples include a mono-, di-, or triglyceride of butyric acid, (e.g., tributyrin).

The term "short chain triglycerides" (SCTs) refers to molecules with short chain fatty acids (6 carbon atoms or less in length, such as 5 carbon atoms or less) attached to a glycerol backbone. These can be provided in the form of mono-, di-, and triglycerides, other esters, salts, or free acids. Examples of short chain fatty acids include formic acid, acetic acid, propionic acid, lactic acid, succinic acid, butyric acid, isobutyric acid, valeric acid, isovaleric acid, and caproic acid, which can be at least partially neutralized to formate, acetate, propionate, lactate, succinate, butyrate, isobutyrate, valerate, isovalerate, and caproate. Tributyrin is a particularly preferred SCT formed from three butyrate groups bonded to a glycerol backbone.

In some embodiments, the autobiotic may also optionally include or be co-administered with a "seedbiotic." The term "seedbiotic" refers to a substance formulated to provide a starter culture of beneficial microorganisms for the large intestine. A seedbiotic may include one or more probiotic bacteria, such as one or more bacteria from the genera *Bacillus, Lactobacillus*, or *Bifidobacteria*. Examples of useful probiotic bacteria include *Lactobacillus acidophilus* (supports elimination of "bad" gut bacteria), *Lactobacillus plantarum* (supports healthy gut function and crowds out bad bacteria), *Bifidobacterium breve* (supports peak digestive health), *Bifidobacterium lactis* (supports immune enhancement), and *Lactobacillus rhamnosus* (supports immune health and helps control levels of bad bacteria in the gut). Such probiotics are typically administered orally, or they can administered as a probiotic enema. A seedbiotic may also include rectally administered substances, such as a fecal microbiota transplant (FMT) (autologous or allogeneic) or a probiotic enema. Such fecal microbiota transplants may also be administered orally or rectally in a suitable dosage form, such as in an oral capsule or rectal suppository, as part of autobiotic supplementation. Alternatively, FMT can be administered directly into the gastrointestinal tract using a nasal gastric tube, an endoscope, a colonoscope, or enema.

A seedbiotic is distinguished from a conventional exogenous probiotic supplement. A seedbiotic is intended to act as a "seed" that the subject's body can then utilize along with the prebiotic and postbiotic components of the autobiotic in order to optimize and perpetuate a healthy microbiome. In contrast to a conventional probiotic supplement or treatment intended for daily use, a seedbiotic is intended for use with minimal dosing (in amount and/or duration of supplementation) to establish a sufficient base within the microbiome for the subject to then enhance with the prebiotic and postbiotic components of the autobiotic composition. For example, a recommended dose of a standard probiotic supplement typically ranges from 1 billion to 10 billion colony-forming units (CFUs), and are intended to be taken several days per week for several weeks, whereas the probiotic content of a seedbiotic (e.g., 250 million to about 1 billion CFUs) may be less than the standard probiotic dose and/or may be supplemented less frequently and/or for a shorter duration and is determined by analysis of need for that particular seedbiotic.

One study showed that fecal microbiota transplantation (FMT) was more effective in quickly restoring a healthy microbiome after administering antibiotics. An autologous FMT (aFMT) was found to be particularly effective where an otherwise healthy person with a healthy microbiome is able to harvest healthy fecal matter for later autologous FMT following treatment with antibiotics. FMT was found to be far more effective in restoring a healthy microbiome after administering antibiotics than probiotics (i.e., since FMT provides an already healthy diverse microbiome).

In some embodiments, the seedbiotic is administered at the same time as or as part of the autobiotic. This can be done by orally administering a conventional probiotic or specially formulated probiotic or FMT dosage form. In other embodiments, it may be beneficial to first administer the seedbiotic, permitting the supplemental microbes to boost the number and/or diversity of microbes in a depleted microbiome, followed by administering the autobiotic to enhance and promote the growth of the boosted microbiome. In yet other embodiments, the it may be beneficial to first administer the autobiotic to enhance and promote the growth of the existing microbiome, followed by administering the seedbiotic to boost the number and/or diversity of microbes in the microbiome to make it even more healthy.

In some embodiments, the autobiotic may optionally include one or more enzymes that promote digestion of the prebiotic component and/or that are beneficial to the microbiome. Examples include fructan beta-fructosidase, inulinase, galactan endo-1,6-beta-galactosidase, glucanase, beta-glucanase, amylase, xylanase, pectinase, and cellulase. Digestive enzymes are advantageously delivered with the prebiotic to accelerate breakdown, such as starting in the stomach and continuing in the intestines. In some embodiments, the enzymes are selected so as to remain bioavailable in the small and large intestines to in continued breakdown of undigested prebiotic components and deliver more readily available fermentable food to the microbiome.

Other enzymes beneficial to the microbiome can be delivered to the intestines to improve microbiome health. An example is glycyl radical enzyme, which is produced by Bilophila wadsworthia, and can health the microbiome breakdown certain molecules, such as sulfur containing molecules. Glycyl radical enzyme can assist the microbiome in converting taurocholate to taurine, which can be used as an anaerobic energy source. Glycyl radical enzyme can also assist in the breakdown of taurine by bacteria to make energy. Thus, glycyl radical enzyme can promote healthier microbiome by helping bacteria process energy. When glycyl radical enzyme enzymatically removes sulfur from molecules, hydrogen sulfide (HS) is produced as a biproduct. While HS can be toxic in high amounts, low amounts may be beneficial to the microbiome by slightly increasing permeability of the intestinal walls and promoting colonization and health of the of the microbiome.

As used herein, "subject" or "patient" refers to mammals, including humans and other primates. The subject may be any mammal requiring metabolic therapy, treatment, or prophylaxis, or any mammal suspected of requiring metabolic therapy, treatment, or prophylaxis. Prophylaxis means that regiment is undertaken to prevent a possible occurrence, such as where a high risk of diabetes or other metabolic disorder is identified. "Patient" and "subject" are used interchangeably herein.

The term "administration" or "administering" is used herein to describe the process in which the autobiotic compositions are delivered to a subject. The composition may be administered in various ways including orally, rectally, or intragastrically, among others.

The term "dosage form" refers to the structural form the composition is provided in and/or the vehicle by which the autobiotic composition is delivered to the user. Example dosage forms include, but are not limited to, tablets, capsules, powders, gels, food products, food additives, beverages/drinks (e.g., in cans, bottles, cartons, pouches, squeeze containers, and the like), beverage additives, candies (e.g., suckers, gummies, pastilles), food supplements, sprays, injectables, and suppositories. Preferred embodiments are formulated as liquids for oral consumption.

The term "unit dose" refers to a dosage form that is configured to deliver a specified quantity or dose of composition or component thereof. Dosage forms may be configured to provide a full unit dose or fraction thereof (e.g., ½, ⅓, or ¼ of a unit dose).

Another dosage form that can be used to provide a unit dose of composition or component thereof is a "unit dose measuring device", such as a cup, scoop, syringe, dropper, spoon, spatula, or colonic irrigation device, which is configured to hold therein a measured quantity of composition equaling a full unit dose or fraction thereof (e.g., ½, ⅓, or ¼ of a unit dose). An example use of such measuring device(s) is in kit together with a bulk container.

For example, a "bulk container", such as a carton, box, can, jar, bag, pouch, bottle, jug, or keg, containing several unit doses of composition (e.g., 5-250 or 10-150 unit doses) can be provided to a user together with a unit dose measuring device that is configured to provide a unit dose, or fraction thereof, of composition or component thereof.

A "kit" for use in providing a composition as disclosed herein in bulk form, while providing unit doses of the composition, may comprise a bulk container holding therein a quantity of composition and a unit dose measuring device configured to provide a unit dose, or fraction thereof, of composition or component thereof. One or more unit dose measuring devices may be positioned inside the bulk container at the time of sale, attached to the outside of the bulk container, prepackaged with the bulk container within a larger package, or provided by the seller or manufacture for use with one or multiple bulk containers.

The kit may include instructions regarding the size of the unit dose, or fraction thereof, and the manner and frequency of administration. The instructions may be provided on the bulk container, prepackaged with the bulk container, placed on packaging material sold with the bulk container, or otherwise provided by the seller or manufacturer (e.g., on websites, mailers, flyers, product literature, etc.) The instructions for use may include a reference on how to use the unit dose measuring device to properly deliver a unit dose or fraction thereof. The instructions may additionally or alternatively include a reference to common unit dose measuring devices, such as spoons, spatulas, scoops, droppers, cups, syringes, colonic irrigation device, and the like, not provided with the bulk container (e.g., in case the provided unit dose measuring device is lost or misplaced). In such case, a kit may be constructed by the end user when following instructions provided on or with the bulk container, or otherwise provided by the seller regarding the product and how to properly deliver a unit dose of composition, or fraction thereof.

The term "exogenous ketone body" refers to beta-hydroxybutyrate, acetoacetate, or a combination thereof. These compounds may be utilized by a subject's body as an energy source during instances of low glucose levels or when these compounds are supplemented in a usable form. Where beta-hydroxybutyrate is included, it may be provided as purified or enriched with the R enantiomer, as purified or enriched with the S enantiomer, or as a racemic mixture. The exogenous ketone bodies may be provided in a free acid form (i.e., beta-hydroxybutyrate and/or acetoacetic acid), salt form, ester form, or combination thereof. Ketone body precursors, such as 1,3-butanediol or ester thereof can be included.

Beta-hydroxybutyrate is the deprotonated form of beta-hydroxybutyric acid having the formula $CH_3CH_2OHCH_2COOH$. The deprotonated form present at typical biological pH levels is $CH_3CH_2OHCH_2COO^-$. The general chemical structure of beta-hydroxybutyrate is:

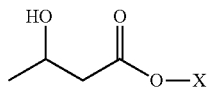

where, X can be hydrogen, metal ion, amino cation such as from an amino acid, alkyl, alkenyl, aryl, or acyl.

When X is a hydrogen, the compound is beta-hydroxybutyric acid. When X is a metal ion or an amino cation, the compounds is a beta-hydroxybutyrate salt. When X is alkyl, alkenyl, aryl, or acyl, the compounds is a beta-hydroxybutyrate ester. The foregoing compounds can be in any desired physical form, such as crystalline, powder, solid, liquid, solution, suspension, or gel.

Acetoacetate is the deprotonated form of acetoacetic acid having the formula $CH_3COCH_2COOH$. The deprotonated form present at typical biological pH levels is $CH_3COCH_2COO^-$. The general chemical structure of acetoacetate is:

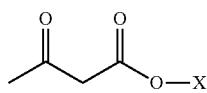

where, X can be hydrogen, metal ion, amino cation such as from an amino acid, alkyl, alkenyl, aryl, or acyl.

When X is a hydrogen, the compound is acetoacetic acid. When X is a metal ion or an amino cation, the compounds is an acetoacetate salt. When X is alkyl, alkenyl, aryl, or acyl, the compounds is an acetoacetate ester. The foregoing compounds can be in any desired physical form, such as crystalline, powder, solid, liquid, solution, suspension, or gel.

The terms "beta-hydroxybutyrate salt" and "acetoacetate salt" do not mean or imply any particular physical state, such as a crystalline, powder, other solid form, dissolved in water to form a liquid solution, dispersed in a liquid to form a suspension, or a gel. A salt can be formed in solution by neutralizing beta-hydroxybutyric acid and/or acetoacetic acid with a strong or weak base, such as an alkali or alkaline earth metal hydroxide, carbonate, or bicarbonate, basic amino acid, and the like.

Exemplary salt forms of butyrate (and/or of beta-hydroxybutyrate when included) include sodium, potassium, calcium, and magnesium salts. Transition metal cations suitable for use as part of a salt include lithium, chromium, manganese, cobalt, copper, zinc, iron, (e.g., as an iron II or iron III cation), molybdenum, and selenium. Other suitable salt forms include cations of amino acids or their derivatives, such as arginine, lysine, leucine, iso-leucine, histidine, ornithine, creatine, agmatine, glutamine, and citrulline.

Exemplary ester forms of butyrate (and/or of beta-hydroxybutyrate when it is also included) include mono-esters of ethanol, mono-esters of 1-propanol, mono-esters of 1,3-propanediol, di-esters of 1,3-propanediol, mono-esters of S-1,3-butanediol, di-esters of S-1,3-butanediol, mono-esters of R-1,3-butanediol, di-esters of R-1,3-butanediol, mono-esters of R—S-1,3-butanediol, di-esters of R—S-1,3-butanediol, and as described above mono-, di-, or tri-esters of glycerin.

II. Autobiotic Compositions

An autobiotic composition comprises a prebiotic component and a postbiotic component. Autobiotic compositions described herein beneficially combine the microbiome-enhancing effects of a prebiotic with the intestinal healing effects of a postbiotic to provide overall benefits to digestive health not possible with administration of either component in isolation.

Prebiotics benefit the gut microbiome by providing an energy and nutrient source for the desirable microorganisms of the large intestine. Sufficient levels of prebiotics aid in the growth of beneficial gut microorganisms (such as *Lactobacilli* and *Bifidobacteria*) and support beneficial gut microbiome diversity. Prebiotics beneficially allow the flora already present within the gut to form a balanced, diverse, and functional ecosystem. As described above, a healthy and properly functioning gut microbiome helps digest certain foods, produces certain vitamins, such as vitamin K and certain B vitamins, and limits colonization of unwanted, pathogenic microorganisms by competing for available space and resources and releasing bacteriophages that kill pathogenic microorganisms.

Endogenous postbiotics are the fermentation byproducts produced by the gut microbiota, including lactic acid, succinic acid, formate, and SCFAs. These SCFAs, and butyrate in particular (the deprotonated form of butyric acid), are beneficial for the health of the intestinal lining. SCFAs may also benefit mood, memory, and/or cognition via influences on the CNS by way of the gut-brain axis. Other beneficial SCFAs include formate, acetate, propionate, lactate, succinate, isobutyrate, valerate, isovalerate, and caproate.

Butyrate promotes intestinal homeostasis, enhances intestinal barrier function, and improves mucosal immunity. Butyrate also has anti-inflammatory properties and is the primary source of energy for colonic epithelial cells, even though it is produced in less abundance endogenously than acetate or propionate (~60% acetate, 25% propionate, and 15% butyrate in humans). See Liu et al. "Butyrate: A Double-Edged Sword for Health?" Advances in Nutrition, vol. 9, issue 1, January 2018, pp. 21-29. Butyrate is believed to be anti-carcinogenic and anti-oxidant. However, these effects are only realized if sufficient amounts of butyrate reach the large intestine and/or are generated within the large intestine. Other useful postbiotic compounds include lactate, succinate, and formate, which are used by the bacteria themselves to proliferate and survive.

Autobiotic compositions described herein are therefore formulated to deliver effective amounts of butyrate or other postbiotic components to the targeted large intestine, as opposed to the stomach and small intestine. One preferred form of postbiotic is tributyrin, which is theorized to deliver a larger proportion of butyrate groups to the large intestine by minimizing losses in the stomach and small intestine.

Although some amount of prebiotics will be found in the diet, the typical modern diet is relatively low in fruits, vegetables, whole grains, and other foods high in prebiotic fiber. The autobiotic compositions described herein beneficially provide a prebiotic component at unnatural amounts and/or unnatural concentrations that are beyond what would be expected to naturally occur in common food products or that could be readily obtained through a standard diet alone.

Similarly, although some amount of postbiotics may be found in the diet, and some are generated endogenously in the large intestine, the autobiotic compositions described herein beneficially provide an exogenous source of postbiotics at unnatural amounts and/or unnatural concentrations that are beyond what would be expected to naturally occur in common food products or that could be readily obtained through a standard diet alone. By way of example, as described above, the typical ratios of endogenous SCFAs in the colon favors acetate and propionate over butyrate. However, exogenous supplementation of a postbiotic component having a higher concentration of butyrate can shift the SCFA ratios in the colon and/or enhance the beneficial effects of butyrate beyond what would be easily obtainable through endogenous production alone.

In a preferred embodiment, the postbiotic component includes an ester of butyric acid, such as a mono-, di-, or triglyceride thereof. Tributyrin is the triglyceride version, including three butyrate groups attached to the glycerol backbone.

While prebiotics can beneficially support a healthy microbiome, and postbiotics can beneficially support intestinal lining health, the combination of both a prebiotic component and a postbiotic component can synergistically enhance these effects to levels greater than if either component is administered in isolation. Without being bound to a particular theory, it is believed that by providing a prebiotic that supports a healthy microbiome and a postbiotic that supports the health of the intestinal lining, a positive feedback loop is generated where the effects of each separate component augment the effects of the other. Co-administering a postbiotic with a prebiotic multiplies the effects of the prebiotic and vice versa.

For example, assisting the natural flora of the gut with the prebiotic component lessens toxicity burdens and proportionally reduces the "bad" bacteria more likely to elicit an inflammatory response at the intestinal lining. At the same time, supporting the intestinal lining with the postbiotic component promotes better nutrient absorption, provides an energy source for the cells of the intestinal lining, and lessens digestive disruptions such as diarrhea to thereby provide a more regulated environment where the "good bacteria" of the microbiome have a better chance of establishing themselves.

Again, the autobiotic compositions described herein allow the body to self-regulate what constitutes "good bacteria." With proper healing of the digestive tract and proper feeding of the microbiome, the microbiome will automatically adjust to fit the individualized niche provided by the subject's unique, personal biological characteristics. The beneficial effects of autobiotic supplementation may be particularly beneficial during or following antibiotic therapy, where the subject's microbiome is likely disrupted and in need of support.

Accordingly, when both the intestinal lining and the gut microbiome are targeted for treatment using an autobiotic composition, improvements tend to perpetuate more rapidly and/or more effectively than when either is targeted alone. Improvements may relate to one or more of digestive health, nutrient absorption, inflammation, allergies and/or other autoimmune symptoms, preventing cancer, energy levels, sleep, mood, and cognition, for example.

The benefits of administering an autobiotic composition as compared to administering a probiotic, prebiotic, or postbiotic are illustrated in FIGS. 1-4.

FIG. 1 illustrates expected synergistic benefits of administering the autobiotic compositions disclosed herein. FIG. 1 shows the expected positive effect, on a relative scale, of a prebiotic composition, a postbiotic composition, and an autobiotic composition that combines a prebiotic component and a postbiotic component (in the same amounts as the prebiotic and postbiotic compositions). As shown, the prebiotic provides a positive effect on the gut microbiome, with some amount of ancillary effect on the intestinal lining. Likewise, the postbiotic provides a positive effect on the intestinal lining, with some ancillary effect on the gut microbiome. In comparison, because of positive feedback loop enhancement, the autobiotic composition provides greater benefits to the intestinal lining than the postbiotic composition and greater benefits to the gut microbiome than the prebiotic composition even though the autobiotic composition includes a similar amount of prebiotic as the prebiotic composition and a similar amount of postbiotic as the postbiotic composition.

Figure 2:
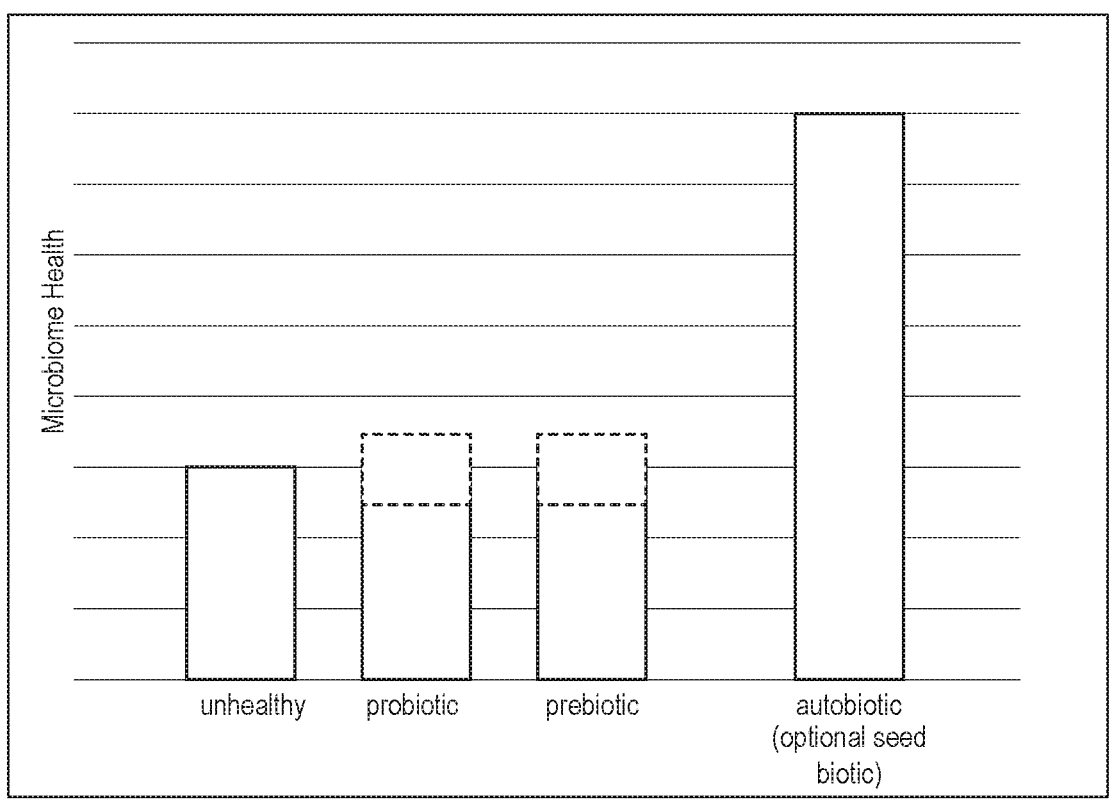
FIG. 2 is a graph that conceptually compares the expected effects on overall microbiome health on a relative scale of an initially unhealthy microbiome after administering a probiotic, a prebiotic, and an autobiotic.

FIG. 2 illustrates the relative effects on microbiome health by administering a probiotic, a prebiotic, or an autobiotic to a person with an unhealthy microbiome. Administering a probiotic may or may not be beneficial. The portion of the graph line that is dotted represents the margin of effectiveness in restoring microbiome health when administering a probiotic to a person with an unhealthy microbiome. Depending on the quality of probiotic, including the preponderance and/or diversity of microbes in the probiotic as well as the preponderance and/or diversity of microbes in the subject, administering the probiotic to the subject may have a positive, negative, or neutral effect. If the subject already has an overabundance of microbes in the probiotic, administering more of such microbes can negatively impact the other less abundant microbes by competing for already scarce nutrients. If, on the other hand, the subject is deficient in microbes in the probiotic, administering such microbes may help restore microbiome health to some degree.

Administering a prebiotic may or may not be beneficial. The portion of the graph line that is dotted represents the margin of effectiveness in restoring microbiome health when administering a probiotic to a person with an unhealthy microbiome. Some prebiotics favor some types of microbes over others (e.g., xylooligosaccharides promote growth of *Bifidobacteria* over *Lactobacillus*). If the subject is deficient in *Bifidobacteria*, administering prebiotics containing xylooligosaccharides may help make up the deficiency. On the other hand, if the subject is deficient in *Lactobacillus*, administering prebiotics containing xylooligosaccharides may worsen the imbalance.

In contrast, administering an autobiotic can consistently improve microbiome health compared to probiotics and prebiotics. By omitting a probiotic, the autobiotic is expected to provide fermentable complex oligosaccharides by way of the prebiotic component, which can increase the ability of beneficial microbes to flourish, and the postbiotic component, which increases the health of the gut lining and promotes colonization of beneficial microbes, thereby increasing the overall number of healthy beneficial microbiota. If a person has a severely weakened microbiome, the autobiotic may include an appropriate seedbiotic.

Figure 3:
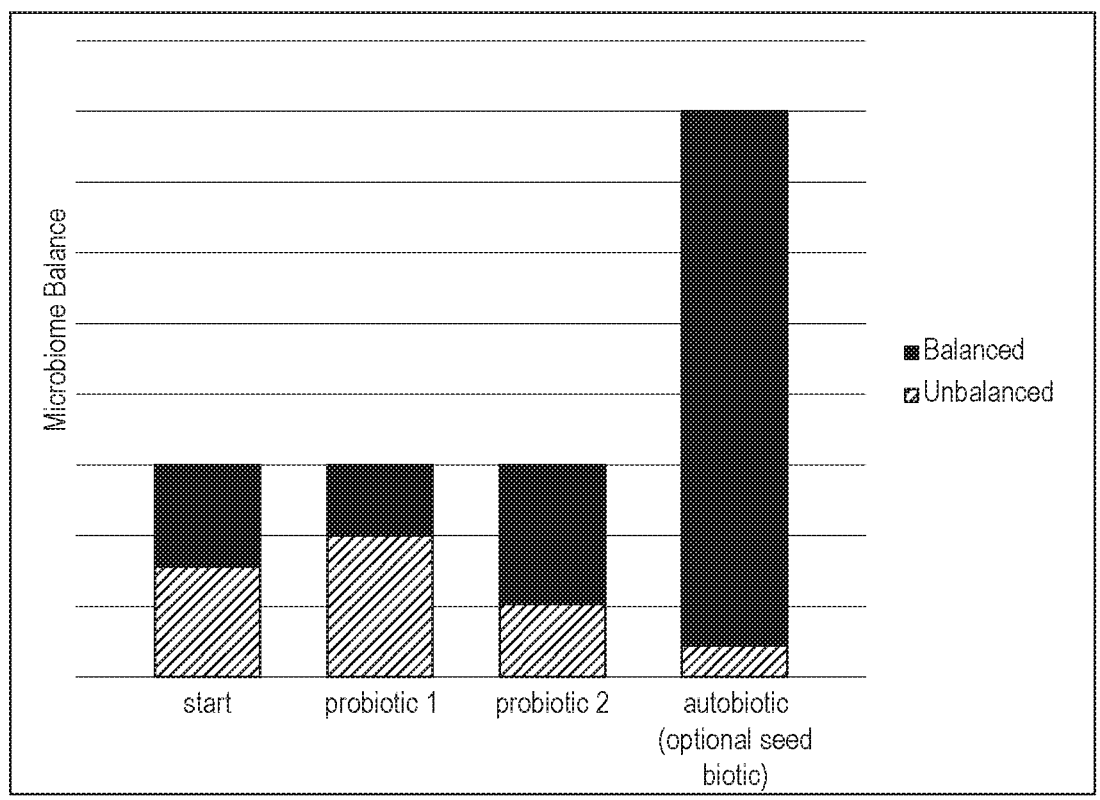
FIG. 3 is a graph that conceptually compares the expected effects on overall microbiome balance on a relative scale of an initially unbalanced microbiome after administering a first probiotic, a second probiotic, and an autobiotic.

FIG. 3 illustrates the relative effects on microbiome balance by administering two different types of probiotic or an autobiotic to a person with an imbalanced microbiome. Administering a probiotic may or may not be beneficial. Administering probiotic 1 is shown as worsening an already unbalanced microbiome. If the subject already has an overabundance of microbes in probiotic 1, administering more of such microbes may create a higher imbalance compared to the already less abundant microbes by competing for already scarce nutrients. Administering probiotic 2 is shown as marginally improving microbiome balance. If the subject is deficient in microbes in the probiotic, administering such microbes may help restore microbiome balance to some degree.

In contrast, administering an autobiotic can consistently improve microbiome balance health compared to probiotics. The autobiotic provides fermentable complex oligosaccharides by way of the prebiotic component, which increase the ability of beneficial microbes to flourish, and the postbiotic component increases gut health and promotes colonization of beneficial microbes, thereby improving the overall balance of the microbiota. If a person has a severely imbalanced microbiome, the autobiotic may include an appropriate seedbiotic that contains deficient microbes. In some cases, the best seedbiotic is a fecal microbiota transplant with a healthy balanced microbiome.

Figure 4:
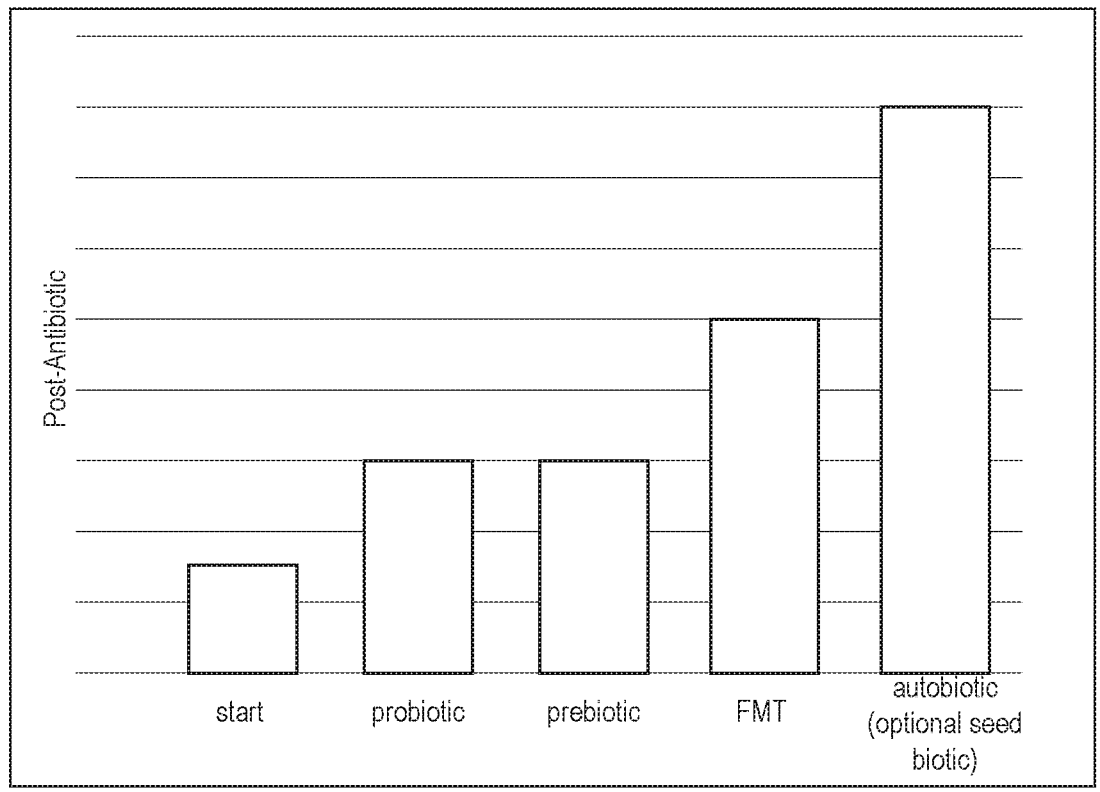
FIG. 4 is a graph that conceptually compares the expected effects on post-antibiotic microbiome health on a relative scale after administering a probiotic, a prebiotic, FMT, and an autobiotic.

FIG. 4 illustrates the relative effects on restoring a person's microbiome after taking antibiotics, which often kill bacteria indiscriminately, sometimes killing beneficial bacteria as much as or more than pathogenic bacteria, by administering probiotics, prebiotics, fecal microbiota transplantation (FMT), and autobiotic. When antibiotics have killed off a large percentage of the subject's microbiome, administering a probiotic is expected to quickly increase the number of gut microbes. A prebiotic may also increase the number of gut microbes, albeit more slowly than a probiotic. FMT has been shown to be better at restoring gut microbes than probiotics, although the procedures is typically performed by a medical doctor and is more expensive.

In contrast, administering an autobiotic can consistently improve microbiome health, including quickly restoring the number of microbes and restoring and maintaining a good balance of microbes. The autobiotic provides fermentable complex oligosaccharides that increase the ability of beneficial microbes to flourish, and the postbiotic component promotes colonization of beneficial microbes, thereby improving the overall number and balance of the microbiota. If a person has a severely compromised microbiome, the autobiotic may include an appropriate seedbiotic that contains a good distribution of beneficial microbes. In some cases, a high quality probiotic may be sufficient. In more severe cases, the seedbiotic can be a fecal microbiota transplant with a healthy balanced microbiome.

In preferred embodiments, the autobiotic composition omits probiotic formulations. Such probiotic formulations typically contain species of bacteria and/or fungi found in fermented foods such as yogurt and kimchi, but in a highly concentrated form administered in a tablet or capsule. Although beneficial in some instances, such concentrated probiotics are also associated with various side effects. including, for example, unpleasant digestive symptoms (e.g., bloating, gas, constipation), small intestine bacterial overgrowth (SIBO), increased histamine or other allergic reactions, and particularly for those with weak or compromised immunity, even infection.

With an autobiotic composition, the side effects of concentrated probiotics can be avoided by targeting the flora already present within the subject's gut. That is, rather than adding exogenous organisms by way of probiotic supplementation, the prebiotic and postbiotic components of an autobiotic function to enhance the microbial flora already present within the subject. Thus, the typical subject will stand to benefit more from treatment that enhances the microbiome already nascent within their digestive system rather than through attempts to overload the gut with concentrated doses of additional microorganisms.

However, there are some circumstances where it may be difficult to bring a subject's microbiome to a desired level of function without supplying exogenous probiotics. Some subjects may have such a lack of beneficial microorganisms and/or lack of initial diversity within the gut microbiome that they may be unable to promote the microbiome just by adding prebiotic and postbiotic components. For example, those undergoing or recently finishing antibiotic therapy may have so disrupted their microbiome that it is unable to recover through prebiotic supplementation alone. Similarly, some may have diets that are so poor as to lack sufficient seeding of any beneficial microorganisms that could utilize the prebiotic supplementation.

In such cases, it may be beneficial to combine the prebiotic and postbiotic components of the autobiotic composition with a probiotic seed (i.e., seedbiotic). Such a seed may be provided via oral administration of concentrated probiotics, via dietary supplementation of probiotic-rich foods (e.g., yogurt, kimchi, kefir, sauerkraut, etc.), and/or via fecal microbiota transplant or an FMT enema.

Administration of *Lactobacillus* probiotics are especially useful to displace pathogenic microbes. However, *Lactobacillus* can also displace beneficial bacteria, such as *Bifidobacteria*. Some prebiotics, such as xylooligosaccharides, promote the growth of *Bifidobacteria* but not *Lactobacillus*. In such cases, administering *Lactobacillus* probiotics to displace harmful bacteria, followed by administering xylooligosaccharides, can help rebalance the *Lactobacillus* and *Bifidobacteria* components of a healthy microbiome.

Some embodiments may additionally include one or more blood sugar and/or insulin regulators. For example, an autobiotic composition may include one or more of capsaicin, berberine, abscisic acid, cinnamon, American ginseng, *Aloe vera, Gymnema sylvestre*, alpha-lipoic acid, magnesium, and chromium. These may benefit the subject by complementing the effects of the other components of the autobiotic composition.

Some embodiments may additionally include one or more ingredients to reduce intestinal permeability, including but not limited to, fulvic acid, shilajit, or other compounds containing fulvic acid and/or humic acid.

Many who suffer from excessive intestinal permeability also suffer from imbalances in digestive hormones such as insulin and ghrelin. These imbalances tend to aggravate the underlying intestinal health problems by disrupting normal hunger signals and blood sugar regulation, which often leads to poor dietary decisions that exacerbate issues with intestinal permeability and/or the gut microbiome.

For example, excessive intestinal impermeability can impact the absorption of vital nutrients, which in turn can disrupt hormonal signaling and cause hunger even though the subject's diet is sufficient in overall caloric intake. Excessive release of ghrelin resulting from malabsorption of nutrients, for example, can lead to conditions such as obesity, metabolic syndrome, and type 2 diabetes. In essence, a subject may feel chronically hungry and may be deficient in one or more nutrients even though they consume an excess of calories.

The effects of the prebiotic and postbiotic components can promote better hormonal balance by improving the subject's underlying intestinal health. In addition, the one or more blood sugar and/or insulin regulators are believed to ease hunger/craving symptoms and synergistically promote the effectiveness of the other components of the autobiotic composition.

Some embodiments may additionally include an exogenous ketone body component such as beta-hydroxybutyrate and/or acetoacetate. The ketone body may be provided as a salt, ester, free acid (i.e., beta-hydroxybutyric acid, acetoacetic acid), or combination thereof. An exogenous ketone body component may be particularly beneficial in applications for supporting cognition, memory, and/or mood. The brain can utilize ketone bodies as an energy source. An increase in the proportion of the brain's energy demand met by ketone bodies, as opposed to glucose, may be associated with benefits to cognition, memory, and/or mood. Medium chain fatty acids or mono-, di-, or triglycerides thereof, can provide a supplementary source of endogenous ketone body production.

When an exogenous ketone body component is combined with the other components of the autobiotic composition, the benefits to cognition, memory, and/or mood may be synergistically enhanced. For example, the prebiotic and postbiotic components of the composition can benefit intestinal health, which supports cognition, memory, and/or mood via the gut-brain axis, while the ketone body component directly supports cognition, memory, and/or mood as an effective energy supply for the brain.

III. Methods of Delivering an Autobiotic Composition

A method of delivering an autobiotic composition to a subject may include the steps of: 1) providing an autobiotic composition comprising a prebiotic component and a postbiotic component; and 2) administering the autobiotic composition to a subject to thereby deliver the prebiotic component and the postbiotic component to gastrointestinal tract, including the stomach, small intestine, and large intestine. The greatest benefit is attained by delivering the autobiotic to the large intestine.

The administration may be carried out to treat or prophylactically treat a subject in need, such as a subject suffering from excessive intestinal permeability and/or intestinal dysbiosis or a subject at risk for such a condition. Administration may also be carried out to treat or prophylactically treat a condition associated with a disrupted gut-brain axis, including cognitive impairment, mood problems (e.g., depression, anxiety, chronic stress), and/or sleep issues.

The autobiotic composition may be administered through any acceptable administration route. Because the therapeutic target is the large intestine, preferred routes of administration include oral and rectal administration.

As described above, some subjects may benefit from a seedbiotic component, while others may be better served by omitting a seedbiotic component. Thus, a method of differential treatment may include: 1) determining whether a subject has sufficient microbiome potential; and 2) based on the microbiome potential determination, either i) provide an autobiotic composition that omits a seedbiotic where the microbiome determination shows sufficient microbiome potential, or ii) provide an autobiotic composition that includes a seedbiotic where the microbiome determination shows insufficient microbiome potential. As described above, the seedbiotic may include a concentrated probiotic, dietary supplementation of probiotic-rich foods (e.g., yogurt, kimchi, kefir, sauerkraut, etc.), and/or fecal microbiota transplant (FMT).

The "microbiome potential" may be determined by sampling the subject's microbiome and determining whether the microbiological diversity exceeds or fails to exceed a predetermined threshold. By way of example, measuring microbiological diversity may be performed using standard microbiological laboratory methods known in the art and/or through genetic sequencing procedures such as 16S ribosomal sequencing.

The threshold may be a simple count of different species present. Alternatively, the threshold may require a certain number of species to be present within each of multiple categories, such as a requirement for a certain number of *Lactobacillus* species and a certain number of *Bifidobacteria* species.

In another example, the microbiome potential may be assumed to be deficient where the subject is currently undertaking antibiotic therapy or has recently finished antibiotic therapy. For example, the microbiome potential may be assumed to be deficient if the subject has undergone antibiotic therapy within the past 2-4 months.

An autobiotic composition may be administered daily, either as a once-a-day supplement or in multiple doses (e.g., 2, 3, 4 or more) spread throughout the day. The autobiotic composition may be administered for a duration needed to treat symptoms, or as an ongoing prophylactic to continuously support microbiome health, intestinal health, cognition, sleep, and/or mood.

In some embodiments, an autobiotic composition is administered according to a personalized "designer" regimen. For example, the particular components that make up the autobiotic composition, relative proportions of the different components, the dosing amount, the dosing frequency, and/or the supplementation duration may vary according to an individual's personal physiology, genetic predisposition for particular microbiome characteristics, personal preferences, and/or needs. In some circumstances, one or more of the foregoing dosage parameters may be varied over time.

IV. Dosage Forms & Amounts

An autobiotic composition may be provided in any dosage form that may be suitably administered to a subject. In preferred embodiments, the dosage form is a capsule or tablet. Powder dosage forms may also be utilized; however, it is preferred that the powder be microencapsulated so as to mask the poor taste of the postbiotic component. Tributyrin and butyrate, for example, are considered to have a rancid, unpleasant taste. Other suitable dosage forms include suppositories and enema formulations for rectal administration. Enema formulations may be used to conveniently co-administer the autobiotic with a seedbiotic (e.g., probiotic or FMT).

Figure 5:
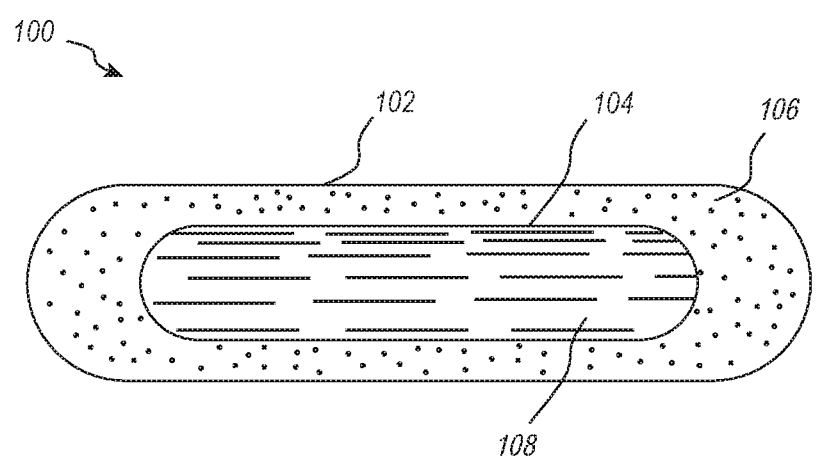
FIG. 5 illustrates an exemplary dual chamber capsule dosage form in which an autobiotic composition may be provided.

FIG. 5 illustrates a dual chamber capsule 100 that can use used to deliver the autobiotic. Dual chamber capsule 100 includes an exterior wall 102 and an interior wall 104, which cooperate to provide outer chamber 106 between exterior wall 102 and interior wall 104, and an inner chamber 108 enclosed by interior wall 104. Exterior wall 102 and interior wall 104 are advantageously oval or have other desired 3-dimensional shape to provide multiple chambers. Chambers of other configurations can be provided, such as side-by-side.

The dual chamber capsule 100 is particularly useful where a multi-component composition includes one or more solid (e.g., powder) components and one or more liquid components that preferably remain unmixed prior to ingestion. In an autobiotic composition, the prebiotic component will often be a powder, while the postbiotic component will often be a liquid (e.g., when provided as liquid tributyrin). The prebiotic may be enclosed within outer chamber 106, positioned in the space between exterior wall 102 and interior wall 104, and the postbiotic can be enclosed within interior chamber 108. In such configuration, the prebiotic will be released first by digestion or breakdown of exterior wall 102, and the postbiotic will be released second after digestion or breakdown of interior wall 102.

In some embodiments, tablets or capsules can be formulated or configured to break down and release the prebiotic and postbiotic at substantially the same time and location within the gastrointestinal tract. In other embodiments, the chambers of a multi-chamber capsule can be formulated or configured to break down at different rates in order to deliver the prebiotic and postbiotic components at different times and/or in different locations within the gastrointestinal tract. For example, a dual chamber capsule may be formulated or configured to release the prebiotic and optional digestive enzymes in the stomach to promote digestion in the stomach and small intestine and be more bioavailable to the microbiome when reaching the large intestine, and later releasing the postbiotic and optional enzymes in the intestines, particularly the large intestine. In other embodiments, a multi-chamber chamber capsule may first release the postbiotic in the intestines to provide a healthy boost to the intestinal lining prior to releasing the prebiotic to enhance growth and colonization of the microbiome. In other cases, it may be beneficial to first release the prebiotic to enhance growth and colonization of microbes of the microbiome prior to releasing the postbiotic to permit the microbiome to generate its own postbiotics and then deliver the supplemental postbiotic as a "dessert".

In the case where enzymes beneficial to the microbiome are included, such enzymes can be delivered alone or together with the postbiotic (e.g., while bypassing the stomach and at least part of the small intestine so as be available in the large intestine. For example, glycyl radical enzyme can be provided (e.g., mixed) with the postbiotic and bypass the stomach and at least part of the small intestine so as to be available in the large intestine.

In some embodiments, an autobiotic daily dose may include about 1 g to about 20 g, or about 2 g to about 15 g, or about 3 g to about 10 g, or about 4 g to about 8 g of the prebiotic component, and about 100 mg to about 10 g, or about 250 mg to about 5 g, or about 500 mg to about 2.5 g. of the postbiotic component. In other the autobiotic daily dose may include about 100 mg to about 20 g, or about 250 mg to about 15 g, or about 0.5 g to about 10 g, or about 1 g to about 8 g of the prebiotic component, and about 25 mg to about 10 g, or about 75 mg to about 5 g, or about 250 mg to about 2.5 g, or about 500 mg to about 1.5 g, of the postbiotic component. For example, the foregoing values may be taken as the desired "unit dose" for each of the components, and the dosage form may be formulated to provide the full unit dose or a fraction thereof such that one or multiple dosage forms may be administered to achieve the full unit dose. In embodiments where a ketone body component is included, it may be included at about 0.5 g to about 50 g, or about 0.75 g to about 25 g, or about 1 g to about 15 g, or about 1.5 g to about 12 g.

EXAMPLES

The following is a description of exemplary autobiotic compositions useful for promoting gut health and enhanced microbiome health and balance.

Example 1

| | |
|---|---|
| Prebiotic (e.g. Vegetable Fiber) | 4 g |
| Postbiotic (e.g. Tributyrin) | 1 g |

The dosage form is a tablet or capsule, such as between 2-4 tablets or capsules to deliver the dosed amounts prebiotic and postbiotic components.

The capsule can be a dual- or multi-chamber capsule that maintains separation between the prebiotic and postbiotic components until the capsule is digested. In some cases the chambers of the dual capsule can be designed to break down at different rates in order to deliver the prebiotic and postbiotic components at different times and/or locations within the gastrointestinal tract.

For example, the prebiotic can be delivered in outer chamber 106 of the dual chamber capsule illustrated in FIG. 5, and the postbiotic can be delivered in inner chamber 108. In this way, the prebiotic is released first and starts to digest in the stomach and continues to digest in the small intestine so as to be more readily available as an energy source to the microbiome in the large intestine. The postbiotic can be protected from being released too early, such as in the stomach where it can be utilized in digestion and absorbed before reaching the intestines. The dosage form can be configured to release the postbiotic in the intestines, preferably in the latter portion of the small intestine and/or the large intestine.

Example 2

To make a drink that can be administered rather than a pill, the following are added to the components of Example 1.

| | |
|---|---|
| Citric acid | to adjust pH to 5.5 |
| Flavorings | to taste |
| Water | 120 ml |

The drink may include undissolved solids (e.g., fiber) so that shaking of the container may be required to disperse the autobiotic components throughout the drink prior to consumption.

Example 3

The composition of Examples 1 or 2 is prepared as a powder, liquid, solid, or gel, which can be used as a food additive, such as for cooking, to provide the autobiotic in a food dosage form.

Example 4

The composition of Examples 1 or 2 is prepared as a powder, liquid, solid, or gel, together with flavorants and sweeteners, which can be mixed into a drink, such as an additive for a fruit smoothie or protein drink.

Example 5

The composition of any of Examples 1 to 4 is augmented with enzymes. Digestive enzymes that promote breakdown of the prebiotic are advantageously delivered together with the prebiotic, such as in a multi-chamber delivery form in Example 1, so as to be released in the stomach and/or small intestine.

Example 6

The composition of any of Examples 1 to 5 is augmented to include enzymes that benefits the microbiome (e.g., glycyl radical enzyme produced by Bilophila wadsworthia), which is advantageously delivered together with the postbiotic, such as in a multi-chamber delivery form in Example 1, so as to be released in the small and/or large intestines.

Example 7

The composition of any of Examples 1 to 6 is augmented to include a seedbiotic that adds additional microbes to a depleted or otherwise unhealthy microbiome to increase the number and/or ratio of microbes in the gut biome. The seedbiotic can be a conventional probiotic and/or it can be a certified healthy fecal microbiota transplant. The seedbiotic is advantageously provided in a separate dosage form, such as a separate oral tablet or capsule, or as a suppository for rectal administration. The seedbiotic can also be formulated to be mixed into an aqueous solution for direct delivery to the intestines, such as by rectal enema or colonic irrigation.

Example 8

The composition of any of Examples 1 to 7 is augmented to include an exogenous ketone body component, such as beta-hydroxybutyrate and/or acetoacetate, to provide energy to the recipient. exogenous ketone body component can be delivered separately or with one or both of the prebiotic and postbiotic.

Example 9

The composition of any of Examples 1 to 8 is augmented to include one or more blood sugar and/or insulin regulators, such as one or more of capsaicin, berberine, derivative thereof, abscisic acid, cinnamon, American ginseng, *Aloe vera, Gymnema sylvestre*, alpha-lipoic acid, magnesium, or chromium.

Example 10

The composition of any of Examples 1 to 9 is augmented to include one or more components that reduce intestinal permeability, such as fulvic acid, shilajit, and compounds containing fulvic acid and/or humic acid.

The claimed device may be embodied in other specific forms without departing from its spirit or essential characteristics. The described embodiments are to be considered in all respects only as illustrative and not restrictive. The scope of the claimed device is, therefore, indicated by the appended claims rather than by the foregoing description. All changes that come within the meaning and range of equivalency of the claims are to be embraced within their scope.

The invention claimed is:

1. An autobiotic composition in the form of a nutritional supplement for supporting a subject's gastrointestinal tract, comprising:
    100 mg to 20 g of a prebiotic component selected from the group consisting of cellulose, fructan, fructo-oligosaccharide, galactan, galacto-oligosaccharide, xylan, xylo-oligosaccharide, beta-glucan, inulin, acacia fiber, *psyllium* fiber, resistant starch, vegetable fiber, fruit fiber, grain fiber, plant fiber, larch tree extract, arabinoxylan-oligosaccharide, arabinoxylan, arabinogalactan, pectin, and combinations thereof; and
    25 mg to 10 g of a postbiotic component selected from the group consisting of one or more short chain fatty acids, one or more salts of the short chain fatty acids, one or more esters of the short chain fatty acids, and combinations thereof, wherein the short chain fatty acids are selected from the group consisting of formic acid, acetic acid, propionic acid, lactic acid, butyric acid, isobutyric acid, valeric acid, isovaleric acid, caproic acid, and, combinations thereof,
    wherein the autobiotic composition is provided in a dosage form configured to first release the prebiotic in the stomach and/or small intestine and thereafter release the postbiotic in the large intestine, and
    wherein the dosage form is a nutritional supplement and omits food.

2. The autobiotic composition of claim 1, wherein the prebiotic component is selected from the group consisting of cellulose, vegetable fiber, fruit fiber, grain fiber, plant fiber, and pectin.

3. The autobiotic composition of claim 1, further comprising one or more enzymes that promote enzymatic breakdown of the prebiotic component in the stomach and/or small intestine.

4. The autobiotic composition of claim 1, wherein the autobiotic composition is free of probiotics.

5. The autobiotic composition of claim 1, wherein the postbiotic comprises one or more short chain fatty acids provided in free acid form and are selected from the group consisting of formic acid, acetic acid, propionic acid, lactic acid, butyric acid, valeric acid, and caproic acid.

6. The autobiotic composition of claim 1, wherein the postbiotic component comprises tributyrin.

7. The autobiotic composition of claim 1, further comprising an enzyme that is beneficial to the microbiome.

8. The autobiotic composition of claim 7, wherein the enzyme is a glycyl radical enzyme.

9. The autobiotic composition of claim 1, further comprising a seedbiotic component.

10. The autobiotic composition of claim 9, wherein the seedbiotic component is a probiotic and/or a fecal microbiota transplant.

11. The autobiotic composition of claim 1, wherein the dosage form is selected from the group consisting of powder, capsule, tablet, edible solid, gel, and liquid.

12. The autobiotic composition of claim 1, wherein the dosage form is a dual chamber capsule having an exterior wall, an interior wall, an outer chamber enclosed between the exterior wall and the interior wall, and an inner chamber enclosed by the interior wall, and wherein the prebiotic is contained in the outer chamber and the postbiotic is contained in the inner chamber.

13. The autobiotic composition of claim 1, further comprising an exogenous ketone body component.

14. The autobiotic composition of claim 1, further comprising a blood sugar regulator and/or an insulin regulator.

15. The autobiotic composition of claim 14, wherein the blood sugar regulator and/or insulin regulator includes one or more of capsaicin, berberine or a derivative thereof, abscisic acid, cinnamon, American *ginseng, Aloe vera, Gymnema sylvestre*, alpha-lipoic acid, magnesium, or chromium.

16. The autobiotic composition of claim 1, further comprising one or more components that reduce intestinal permeability selected from fulvic acid, shilajit, and compounds containing fulvic acid and/or humic acid.

17. An autobiotic composition in the form of a nutritional supplement for supporting a subject's gastrointestinal tract, comprising:
   a prebiotic component selected from the group consisting of cellulose, vegetable fiber, fruit fiber, grain fiber, plant fiber, resistant starch, larch tree extract, acacia fiber, *psyllium* fiber, and pectin; and
   a postbiotic component,
   wherein the autobiotic composition is provided in a dosage form that provides 250 mg to 15 g of the prebiotic component and 75 mg to 5 g of the postbiotic component, wherein the dosage form comprises one or more dual chamber capsules, each dual chamber capsule comprising an exterior wall, an interior wall, an outer chamber enclosed between the exterior wall and the interior wall, and an inner chamber enclosed by the interior wall,
   wherein the interior wall forms a continuous, unbroken enclosure separating the outer chamber from the inner chamber,
   wherein the outer chamber contains the prebiotic and the inner chamber contains the postbiotic,
   wherein the one or more dual chamber capsules are configured to deliver the prebiotic to the stomach and/or small intestine of the subject and the postbiotic to the large intestine of the subject, and
   wherein the dosage form is a nutritional supplement and omits food.

18. The autobiotic composition of claim 17, further comprising an exogenous ketone body component.

19. An autobiotic composition in the form of a nutritional supplement for supporting a human subject's gastrointestinal tract, comprising:
   0.5 g to 10 g of a prebiotic component selected from the group consisting of cellulose, vegetable fiber, fruit fiber, grain fiber, plant fiber, resistant starch, larch tree extract, arabinoxylan-oligosaccharide, arabinoxylan, arabinogalactan, acacia fiber, *psyllium* fiber, pectin, and combinations thereof; and
   250 mg to 2.5 g of a postbiotic component comprised of tributyrin,
   wherein the autobiotic composition is provided in a dosage form selected from the group consisting of a powder, edible solid, gel, liquid capsule, and tablet,
   wherein the dosage form is a human nutritional supplement and omits food,
   wherein the dosage form is configured to first release the prebiotic in the stomach and/or the small intestine and thereafter release the postbiotic in the large intestine.

* * * * *